US011724883B2

(12) United States Patent
Johnson et al.

(10) Patent No.: US 11,724,883 B2
(45) Date of Patent: Aug. 15, 2023

(54) PRESORT SYSTEM FOR EXECUTING ROBOT-ASSISTED PUTAWAY TASKS

(71) Applicant: Locus Robotics Corp., Wilmington, MA (US)

(72) Inventors: Sean Johnson, Danvers, MA (US); Luis Jaquez, Burlington, MA (US); Michael Charles Johnson, Ashland, MA (US)

(73) Assignee: Locus Robotics Corp., Wilmington, MA (US)

( * ) Notice: Subject to any disclaimer, the term of this patent is extended or adjusted under 35 U.S.C. 154(b) by 278 days.

(21) Appl. No.: 17/017,833

(22) Filed: Sep. 11, 2020

(65) Prior Publication Data

US 2022/0081216 A1    Mar. 17, 2022

(51) Int. Cl.
*B25J 9/00* (2006.01)
*B25J 9/16* (2006.01)
(Continued)

(52) U.S. Cl.
CPC .......... *B65G 1/1378* (2013.01); *B25J 9/0009* (2013.01); *B25J 9/161* (2013.01); *B25J 9/1653* (2013.01); *B25J 9/1679* (2013.01); *B25J 9/1697* (2013.01); *B25J 13/088* (2013.01); *B65G 2203/041* (2013.01)

(58) Field of Classification Search
CPC ........ B25J 9/0009; B25J 9/161; B25J 9/1653; B25J 9/1679; B25J 9/1697; B25J 13/088
See application file for complete search history.

(56) References Cited

U.S. PATENT DOCUMENTS

| 4,678,390 A | 7/1987 | Bonneton et al. |
| 6,764,373 B1 | 7/2004 | Osawa et al. |

(Continued)

FOREIGN PATENT DOCUMENTS

EP    0 235 488    9/1987

OTHER PUBLICATIONS

International Searching Authority/EP, International Search Report and Written Opinion of the International Searching Authority, Application No. PCT/2021/049563, dated Jan. 7, 2022, 12 pages.
(Continued)

*Primary Examiner* — Kira Nguyen
(74) *Attorney, Agent, or Firm* — Sunstein LLP

(57) ABSTRACT

Systems and methods for presorting and executing robot-assisted putaway tasks in a navigational space include assigning each of a plurality of item storage arrays to one of a plurality of zones defined within the navigational space, scanning an item identifier of at least one of a plurality of unsorted items to be stored at locations throughout the warehouse, retrieving, in response to receiving identifying information corresponding to the at least one scanned unsorted item, item data describing a storage location for putaway within the warehouse of each of the at least one scanned items, determining, from the storage location, a corresponding one of the plurality of zones of the warehouse in which the storage location is located, and placing each scanned unsorted item into an interconnected container of one of the item storage arrays assigned to the corresponding one of the zones.

20 Claims, 21 Drawing Sheets

(51) Int. Cl.
  *B65G 1/137* (2006.01)
  *B25J 13/08* (2006.01)

(56) References Cited

U.S. PATENT DOCUMENTS

| | | | |
|---|---|---|---|
| 7,751,928 | B1 | 7/2010 | Antony et al. |
| 8,731,708 | B2 | 5/2014 | Shakes et al. |
| 9,463,927 | B1 * | 10/2016 | Theobald ............ B65G 1/1373 |
| 9,466,046 | B1 * | 10/2016 | Theobald ............ G06Q 10/087 |
| 9,829,333 | B1 | 11/2017 | Calder |
| 10,282,696 | B1 | 5/2019 | Bettis et al. |
| 10,489,870 | B2 | 11/2019 | Asaria et al. |
| 2012/0330458 | A1 | 12/2012 | Weiss |
| 2013/0317642 | A1 | 11/2013 | Asaria et al. |
| 2014/0350725 | A1 | 11/2014 | LaFary et al. |
| 2015/0073589 | A1 | 3/2015 | Khodl et al. |
| 2015/0332213 | A1 | 11/2015 | Galluzzo et al. |
| 2017/0158431 | A1 | 6/2017 | Hamilton et al. |
| 2017/0183159 | A1 | 6/2017 | Weiss |
| 2017/0274531 | A1 | 9/2017 | Johnson et al. |
| 2018/0029797 | A1 | 2/2018 | Hance et al. |
| 2018/0043533 | A1 | 2/2018 | Johnson et al. |
| 2018/0059635 | A1 * | 3/2018 | Johnson ............ B65G 1/1373 |
| 2018/0365631 | A1 * | 12/2018 | Moulin ................ G08G 1/20 |
| 2018/0370728 | A1 | 12/2018 | Gallagher et al. |
| 2019/0062055 | A1 * | 2/2019 | Hance ................ G05D 1/021 |
| 2019/0094876 | A1 | 3/2019 | Moore et al. |
| 2019/0241313 | A1 * | 8/2019 | Sussman ............ B65D 21/0224 |
| 2019/0243358 | A1 * | 8/2019 | Jaquez ................ G05D 1/0276 |
| 2020/0031578 | A1 * | 1/2020 | Lisso .................. B65G 1/0492 |
| 2020/0051195 | A1 | 2/2020 | Asaria et al. |
| 2020/0172352 | A1 * | 6/2020 | Elazary ................ B65G 59/02 |
| 2020/0202285 | A1 | 6/2020 | Elazary et al. |
| 2020/0239232 | A1 | 7/2020 | Johnson et al. |
| 2022/0083063 | A1 * | 3/2022 | Ben Shalom ........ G05D 1/0274 |

OTHER PUBLICATIONS

International Searching Authority/EP, International Search Report and Written Opinion of the International Searching Authority, Application No. PCT/US2021/049236, dated Nov. 29, 2021, 16 pages.

United States Patent and Trademark Office, Office Action, U.S. Appl. No. 17/017,766, dated Feb. 3, 2022, 30 pages.

S. Johnson et al., *Dynamic Item Putaway Management Using Mobile Robots*, U.S. Appl. No. 17/017,766, filed Sep. 11, 2020, 39 pages.

* cited by examiner

| Fiducial ID | x | y | z | quaternion.x | quaternion.y | quaternion.z | quaternion.w |
|---|---|---|---|---|---|---|---|
| 1 | -10.2 | 2.3 | 0 | 0 | 0 | 0 | 1 |
| 2 | 23.1 | 15.8 | 0 | 0 | 0 | 0 | 1 |
| 3 | 45.3 | 3.3 | 0 | 0 | 0 | -1 | 0 |

| Location | Fiducial ID |
|----------|-------------|
| L01001A | 11 |
| L01001B | 11 |
| L01001C | 11 |
| L01001D | 11 |
| L01001E | 11 |
| L01001F | 11 |
| L01002A | 12 |
| L01002B | 12 |
| L01002C | 12 |
| L01002D | 12 |
| L01002E | 12 |
| L01003A | 13 |
| L01003B | 13 |
| L01003C | 13 |
| L01003D | 13 |
| L01003E | 13 |
| L01003F | 13 |
| L01004A | 14 |
| L01004B | 14 |
| L01004C | 14 |
| L01004D | 14 |
| L01004E | 14 |
| L01005A | 15 |
| L01005B | 15 |
| L01005C | 15 |
| L01005D | 15 |
| L01005E | 15 |
| L01005F | 15 |

| Array Code | Number of Components | Comp. ID | Comp. Color | Comp. Size |
|---|---|---|---|---|
| 001 | 3 | T81001<br>T81002<br>T81003 | Blue<br>Yellow<br>Green | A x B x C |
| ⋮ | ⋮ | ⋮ | ⋮ | ⋮ |

PRESORT SYSTEM FOR EXECUTING ROBOT-ASSISTED PUTAWAY TASKS

FIELD OF THE INVENTION

This invention relates to robot-assisted putaway tasks and more particularly to a presort system for executing robot-assisted putaway tasks.

BACKGROUND OF THE INVENTION

Ordering products over the internet for home delivery is an extremely popular way of shopping. Fulfilling such orders in a timely, accurate and efficient manner is logistically challenging to say the least. Clicking the "check out" button in a virtual shopping cart creates an "order." The order includes a listing of items that are to be shipped to a particular address. The process of "fulfillment" involves physically taking or "picking" these items from a large warehouse, packing them, and shipping them to the designated address. An important goal of the order-fulfillment process is thus to ship as many items in as short a time as possible.

The order-fulfillment process typically takes place in a large warehouse that contains many products, including those listed in the order. Among the tasks of order fulfillment is therefore that of traversing the warehouse to find and collect the various items listed in an order. In addition, the products that will ultimately be shipped first need to be received in the warehouse and stored or "placed" in storage bins in an orderly fashion throughout the warehouse so they can be readily retrieved for shipping.

In a large warehouse, the goods that are being delivered and ordered can be stored in the warehouse very far apart from each other and dispersed among a great number of other goods. With an order-fulfillment process using only human operators to place ("putaway") and pick the goods requires the operators to do a great deal of walking and can be inefficient and time consuming. Since the efficiency of the fulfillment process is a function of the number of items shipped per unit time, increasing time reduces efficiency.

Robot assisted order-fulfillment systems have been used to increase efficiency and productivity. In some systems, a plurality of individual receptacles have been placed on a mobile robot base in order for the robot base to execute multiple orders. Such a system is described in U.S. Patent Application Publication No. 2015/0073589. There are, however, inefficiencies with these system and improvements are needed to further increase efficiency and throughput of such robot assisted order-fulfillment systems.

One such inefficiency is in connection with putaway of unsorted items. When, for example, online orders are returned to a warehouse, a large number of mixed, unsorted items can pile up at a receiving dock for subsequent putaway. Conventionally, putaway methodologies generally require that the unsorted items be put away on a first-come first-served basis, wherein carts or totes are just loaded with a series of geographically unrelated items and then human pickers are sent along in highly disorganized and inefficient travel routing in order to execute the putaway tasks.

BRIEF SUMMARY OF THE INVENTION

Provided herein are systems and methods for presorting for executing robot-assisted putaway tasks.

In one aspect, a method for presorting and executing robot-assisted putaway tasks in a navigational space is provided. The method includes assigning each of a plurality of item storage arrays to one of a plurality of zones defined within the navigational space, each item storage array including a plurality of interconnected containers, each of the interconnected containers for storing items associated with a putaway task. The method also includes scanning, by a scanning device, an item identifier of at least one of a plurality of unsorted items to be stored at locations throughout the warehouse. The method also includes retrieving, by a centralized server, in response to receiving identifying information corresponding to the at least one scanned unsorted item, item data describing a storage location for putaway within the warehouse of each of the at least one scanned item. The method also includes determining, from the storage location, a corresponding one of the plurality of zones of the warehouse in which the storage location is located. The method also includes placing each scanned unsorted item into an interconnected container of one of the item storage arrays assigned to the corresponding one of the zones.

In some embodiments, the method also includes inducting the item storage array into which the scanned unsorted item was placed to a robot. In some embodiments, the method also includes transmitting, from the centralized server to at least one robot, a putaway task assignment associated with each of the plurality of interconnected containers of the inducted item storage array. In some embodiments, the method also includes navigating the robot, via a processor of the robot and in response to receipt of the putaway task assignments at the robot, to locations throughout the warehouse to execute the putaway task assignments. In some embodiments, the method also includes displaying an identification of the corresponding one of the zones on at least one of the scanning device or a computing device.

In some embodiments, each item storage array includes an array identifier associated with the item storage array per se rather than the individual containers. In some embodiments, each item storage array includes a container identifier associated with each of the individual containers in the item storage array. In some embodiments, the method also includes scanning, by the scanning device, the array identifier of the item storage array. In some embodiments, the method also includes assigning, responsive to a user input at a user interface of the at least one of the scanning device or a computing device, the item storage array to one of the plurality of zones. In some embodiments, the method also includes correlating, in the centralized server, the array identifier of the item storage array into which a first one of the at least one scanned unsorted items is placed with the corresponding one of the zones.

In some embodiments, the method also includes scanning, by the scanning device, an item identifier of an additional unsorted item to be stored. In some embodiments, the method also includes retrieving, by the centralized server, in response to receiving identifying information corresponding to the additional scanned unsorted item, additional item data describing an additional storage location for putaway within the warehouse of the additional scanned item. In some embodiments, the method also includes determining, from the additional storage location of the additional scanned item, that the additional scanned item corresponds to a same corresponding zone. In some embodiments, the method also includes placing the additional scanned unsorted item into an empty one of the interconnected containers of the item storage array assigned to the same corresponding zone. In some embodiments, the method also includes displaying an identification of the empty one of the interconnected containers of the item storage array on at least one of the scanning device or a computing device. In some embodiments, the item storage array is attached to an armature affixed to the robot and the item storage array is located above a surface of the robot. In some embodiments, the step of navigating includes displaying, by the robot, at least one of a container identification number and a container color to inform an operator which of the interconnected containers in the inducted item storage array is associated with the execution of each putaway task assignment.

In another aspect, a presorting system for executing robot-assisted putaway tasks within a navigational space is provided. The presorting system includes a plurality of item storage arrays each including a plurality of interconnected containers, each of the interconnected containers for storing items associated with a putaway task. The presorting system also includes at least one scanning device configured to scan an item identifier of at least one of a plurality of unsorted items, the item identifier correlated to item data stored in a centralized server, the item data describing a storage location for putaway within the warehouse. The presorting system also includes the centralized server including a memory storing instructions. The instructions, when executed by the processor, cause the system to assign each of the plurality of item storage arrays to one of a plurality of zones defined within the navigational space. The instructions, when executed by the processor, also cause the system to scan an item identifier of at least one of the plurality of unsorted items to be stored at locations throughout the warehouse. The instructions, when executed by the processor, also cause the system to retrieve, in response to receiving identifying information corresponding to the at least one scanned unsorted item, the item data. The instructions, when executed by the processor, also cause the system to determine, from the storage location, a corresponding one of the plurality of zones of the warehouse in which the storage location is located. The instructions, when executed by the processor, also cause the system to associate each scanned unsorted item with an interconnected container of one of the item storage arrays assigned to the corresponding one of the zones.

In some embodiments, the presorting system also includes at least one robot. In some embodiments, the robot includes a mobile base for inducting the item storage array into which the scanned unsorted item was placed. In some embodiments, the robot includes a transceiver for receiving, at the robot, a putaway task assignment from the centralized server associated with each of the plurality of containers of the item storage array. In some embodiments, the robot includes a processor configured to, in response to receipt of the putaway task assignments by the transceiver, navigate the robot to locations throughout the warehouse to execute the putaway task assignments associated with each of the plurality of containers of the item storage array. In some embodiments, the presorting system also includes a display of at least one of the scanning device or a computing device configured to display an identification of at least one of the corresponding one of the zones or the associated interconnected container. In some embodiments, each item storage array includes an array identifier associated with the item storage array per se rather than the individual containers. In some embodiments, each item storage array includes a container identifier associated with each of the individual containers in the item storage array. In some embodiments, the instructions, when executed by the processor, also cause the system to scan the array identifier of the item storage array. In some embodiments, the instructions, when executed by the processor, also cause the system to assign, responsive to a user input at a user interface of the at least one of the scanning device or a computing device, the item storage array to one of the plurality of zones. In some embodiments, the instructions, when executed by the processor, also cause the system to correlate, in the centralized server, the array identifier of the item storage array into which a first one of the at least one scanned unsorted items is placed with the corresponding one of the zones. In some embodiments, the instructions, when executed by the processor, also cause the system to scan an item identifier of an additional unsorted item to be stored. In some embodiments, the instructions, when executed by the processor, also cause the system to retrieve, in response to receiving identifying information corresponding to the additional scanned unsorted item, additional item data describing an additional storage location for putaway within the warehouse of the additional scanned item. In some embodiments, the instructions, when executed by the processor, also cause the system to determine, from the additional storage location of the additional scanned item, that the additional scanned item corresponds to a same corresponding zone. In some embodiments, the instructions, when executed by the processor, also cause the system to display instructions to a user to place the additional scanned unsorted item into an empty one of the interconnected containers of the item storage array assigned to the same corresponding zone. In some embodiments, the instructions, when executed by the processor, also cause the system to display an identification of the associated empty one of the interconnected containers of the item storage array on at least one of the scanning device or a computing device. In some embodiments, the item storage array is attached to an armature affixed to the robot and the item storage array is located above a surface of the robot. In some embodiments, the item storage array is disposed on a surface of the at least one robot.

These and other features of the invention will be apparent from the following detailed description and the accompanying figures, in which:

BRIEF DESCRIPTION OF THE FIGURES

FIG. 6 is a table of the fiducial identification to pose mapping;

FIG. 7 is a table of the bin location to fiducial identification mapping;

FIG. 13 is a table of data regarding the characteristics of the storage arrays used according to this invention.

DETAILED DESCRIPTION OF INVENTION

Figure 1:
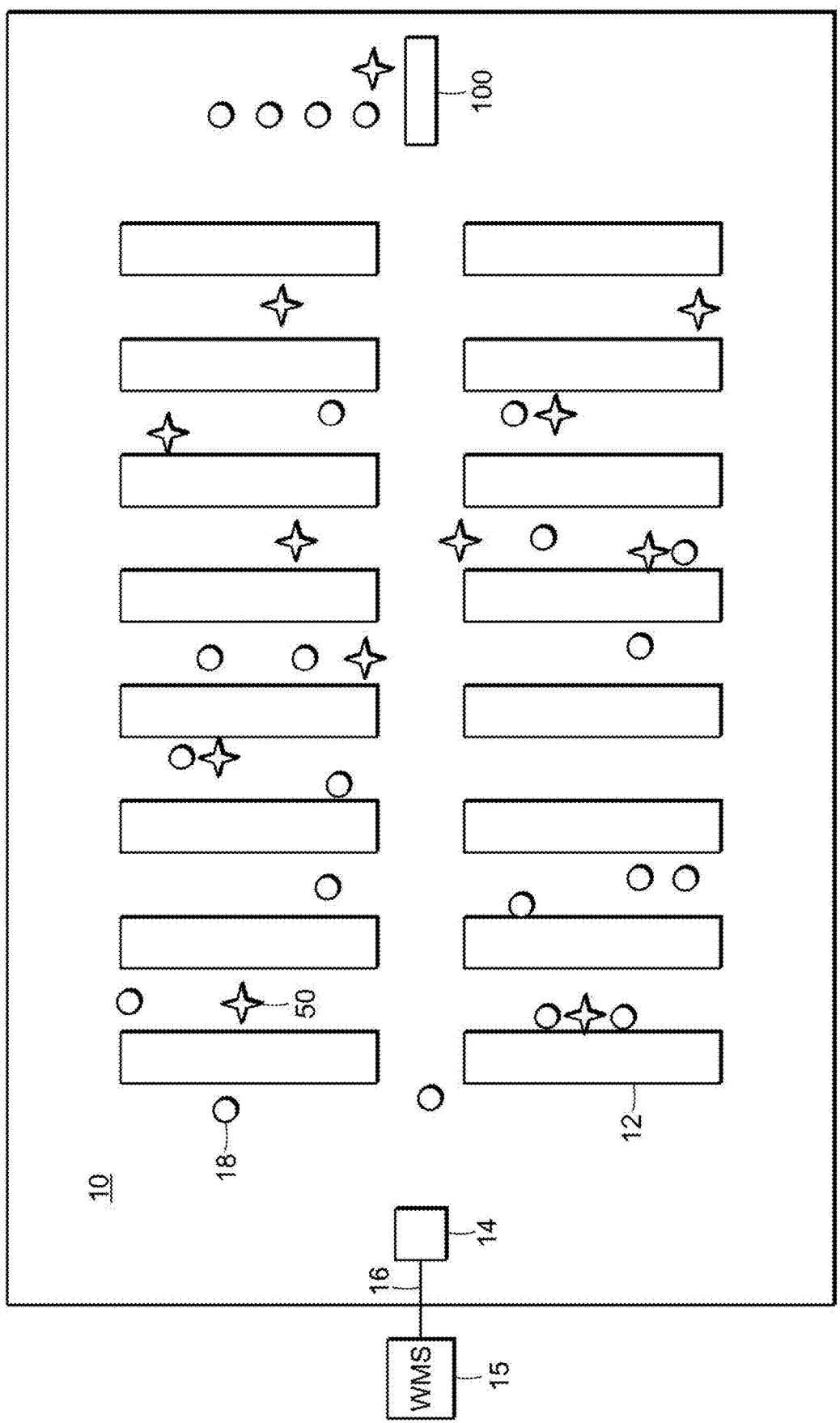
FIG. 1 is a top plan view of an order-fulfillment warehouse.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

The invention is directed to a presort system for executing robot-assisted putaway tasks. Although not restricted to any particular robot application, one suitable application that the invention may be used in is item putaway within a warehouse. The use of robots in this application will be described to provide context for robot-assisted putaway tasks but is not limited to that application.

Referring to FIG. 1, a typical order-fulfillment warehouse 10 includes shelves 12 filled with the various items that could be included in an order. In operation, an incoming stream of orders 16 from warehouse management server 15 arrive at an order-server 14. The order-server 14 may prioritize and group orders, among other things, for assignment to robots 18 during an induction process. As the robots are inducted by operators, at a processing station (e.g. station 100), the orders 16 are assigned and communicated to robots 18 wirelessly for execution. It will be understood by those skilled in the art that order server 14 may be a separate server with a discrete software system configured to interoperate with the warehouse management system server 15 and warehouse management software or the order server functionality may be integrated into the warehouse management software and run on the warehouse management server 15.

Figure 2A:
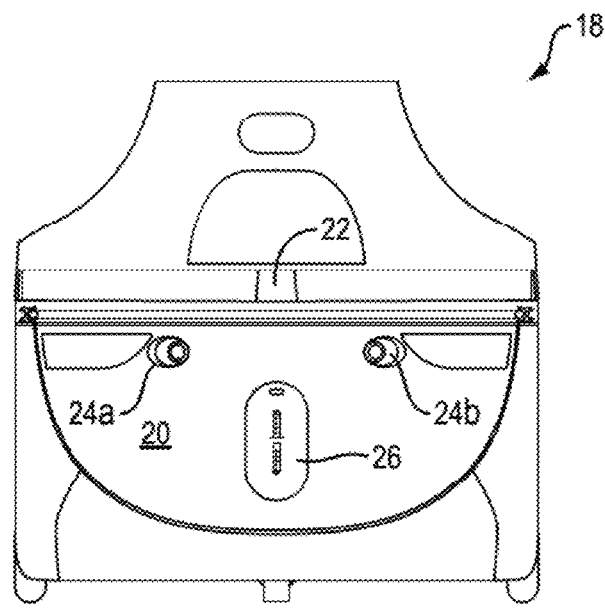
FIG. 2A is a front elevational view of a base of one of the robots used in the warehouse shown in FIG. 1.
Figure 2B:
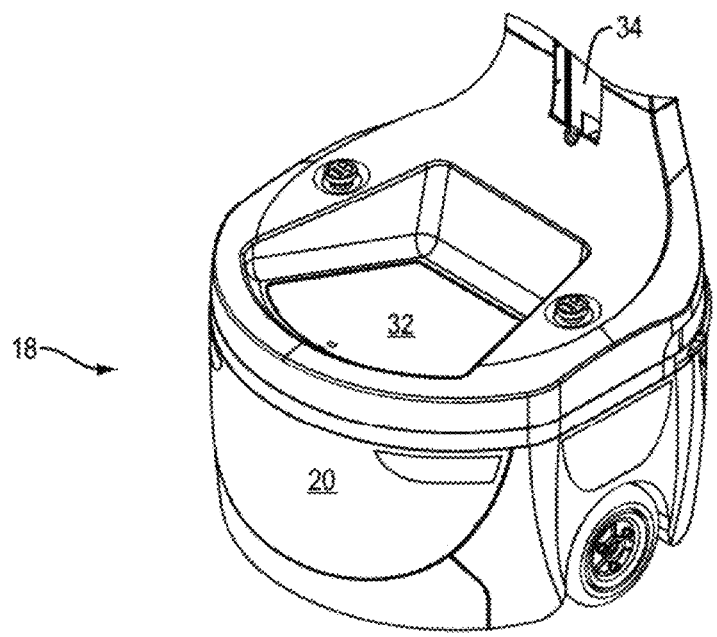
FIG. 2B is a perspective view of a base of one of the robots used in the warehouse shown in FIG. 1.
Figure 3:
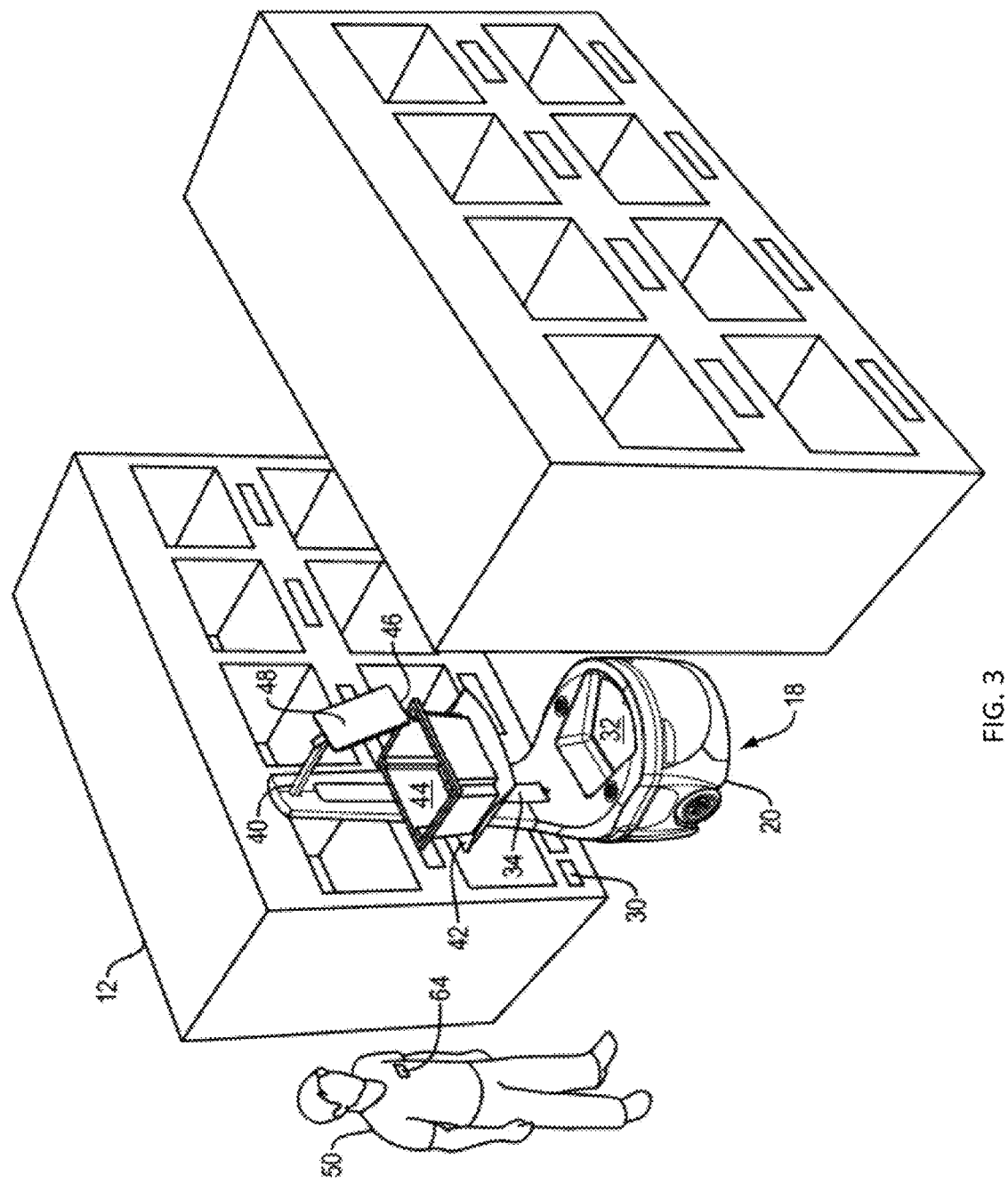
FIG. 3 is a perspective view of the robot in FIGS. 2A and 2B outfitted with an armature and parked in front of a shelf shown in FIG. 1.

In a preferred embodiment, a robot 18, shown in FIGS. 2A and 2B, includes an autonomous wheeled base 20 having a laser-radar 22. The base 20 also features a transceiver (not shown) that enables the robot 18 to receive instructions from and transmit data to the order-server 14 and/or other robots, and a pair of digital optical cameras 24a and 24b. The robot base also includes an electrical charging port 26 for re-charging the batteries which power autonomous wheeled base 20. The base 20 further features a processor (not shown) that receives data from the laser-radar and cameras 24a and 24b to capture information representative of the robot's environment. There is a memory (not shown) that operates with the processor to carry out various tasks associated with navigation within the warehouse 10, as well as to navigate to fiducial marker 30 placed on shelves 12, as shown in FIG. 3. Fiducial marker 30 (e.g. a two-dimensional bar code) corresponds to bin/location of an item ordered. The navigation approach of this invention is described in detail below with respect to FIGS. 4-8. Fiducial markers are also used to identify charging stations according to an aspect of this invention and the navigation to such charging station fiducial markers is the same as the navigation to the bin/location of items ordered. Once the robots navigate to a charging station, a more precise navigation approach is used to dock the robot with the charging station and such a navigation approach is described below.

Referring again to FIG. 2B, base 20 includes an upper surface 32 where a tote or bin could be stored to carry items. There is also shown a coupling 34 that engages any one of a plurality of interchangeable armatures 40, one of which is shown in FIG. 3. The particular armature 40 in FIG. 3 features a tote-holder 42 (in this case a shelf) for carrying a tote 44 that receives items, and a tablet holder 46 (or laptop/other user input device) for supporting a tablet 48. In some embodiments, the armature 40 supports one or more totes for carrying items. In other embodiments, the base 20 supports one or more totes for carrying received items. As used herein, the term "tote" includes, without limitation, cargo holders, bins, cages, shelves, rods from which items can be hung, caddies, crates, racks, stands, trestle, containers, boxes, canisters, vessels, and repositories.

Although a robot 18 excels at moving around the warehouse 10, with current robot technology, it is not very good at quickly and efficiently picking items from a shelf and placing them in the tote 44 due to the technical difficulties associated with robotic manipulation of objects. A more efficient way of picking items is to use a local operator 50, which is typically human, to carry out the task of physically removing an ordered item from a shelf 12 and placing it on robot 18, for example, in tote 44. The robot 18 communicates the order to the local operator 50 via the tablet 48 (or laptop/other user input device), which the local operator 50 can read, or by transmitting the order to a handheld device used by the local operator 50.

Upon receiving an order 16 from the order server 14, the robot 18 proceeds to a first warehouse location, e.g. as shown in FIG. 3. It does so based on navigation software stored in the memory and carried out by the processor. The navigation software relies on data concerning the environment, as collected by the laser-radar 22, an internal table in memory that identifies the fiducial identification ("ID") of fiducial marker 30 that corresponds to a location in the warehouse 10 where a particular item can be found, and the cameras 24a and 24b to navigate.

Upon reaching the correct location (pose), the robot 18 parks itself in front of a shelf 12 on which the item is stored and waits for a local operator 50 to retrieve the item from the shelf 12 and place it in tote 44. If robot 18 has other items to retrieve it proceeds to those locations. The item(s) retrieved by robot 18 are then delivered to a processing station 100, FIG. 1, where they are packed and shipped. While processing station 100 has been described with regard to this figure as being capable of inducting and unloading/packing robots, it may be configured such that robots are either inducted or unloaded/packed at a station, i.e. they may be restricted to performing a single function.

It will be understood by those skilled in the art that each robot may be fulfilling one or more orders and each order may consist of one or more items. Typically, some form of route optimization software would be included to increase efficiency, but this is beyond the scope of this invention and is therefore not described herein.

In order to simplify the description of the invention, a single robot 18 and operator 50 are described. However, as is evident from FIG. 1, a typical fulfillment operation includes many robots and operators working among each other in the warehouse to fill a continuous stream of orders.

The baseline navigation approach of this invention, as well as the semantic mapping of a SKU of an item to be retrieved to a fiducial ID/pose associated with a fiducial marker in the warehouse where the item is located, is described in detail below with respect to FIGS. 4-8.

Using one or more robots 18, a map of the warehouse 10 must be created and the location of various fiducial markers dispersed throughout the warehouse must be determined. To do this, one or more of the robots 18 as they are navigating the warehouse they are building/updating a map 10a, FIG. 4, utilizing its laser-radar 22 and simultaneous localization and mapping (SLAM), which is a computational problem of constructing or updating a map of an unknown environment. Popular SLAM approximate solution methods include the particle filter and extended Kalman filter. The SLAM GMapping approach is the preferred approach, but any suitable SLAM approach can be used.

Robot 18 utilizes its laser-radar 22 to create map 10a of warehouse 10 as robot 18 travels throughout the space identifying, open space 112, walls 114, objects 116, and other static obstacles, such as shelf 12, in the space, based on the reflections it receives as the laser-radar scans the environment.

Figure 4:
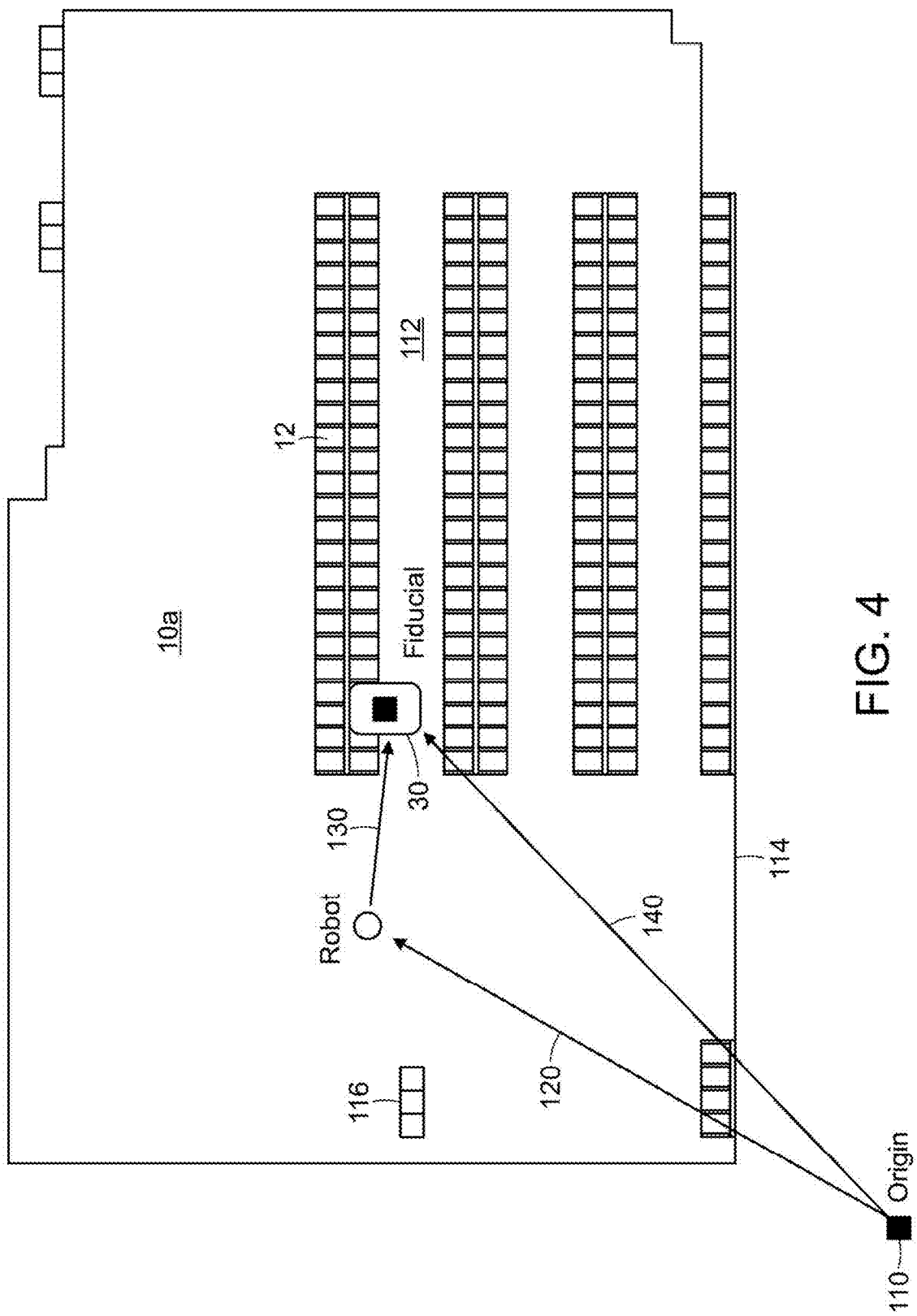
FIG. 4 is a partial map of the warehouse of FIG. 1 created using laser radar on the robot.

While constructing the map 10a (or updating it thereafter), one or more robots 18 navigates through warehouse 10 using camera 26 to scan the environment to locate fiducial markers (two-dimensional bar codes) dispersed throughout the warehouse on shelves proximate bins, such as 32 and 34, FIG. 3, in which items are stored. Robots 18 use a known starting point or origin for reference, such as origin 110. When a fiducial marker, such as fiducial marker 30, FIGS. 3 and 4, is located by robot 18 using its camera 26, the location in the warehouse relative to origin 110 is determined.

By the use of wheel encoders and heading sensors, vector 120, and the robot's position in the warehouse 10 can be determined. Using the captured image of a fiducial marker/two-dimensional barcode and its known size, robot 18 can determine the orientation with respect to and distance from the robot of the fiducial marker/two-dimensional barcode, vector 130. With vectors 120 and 130 known, vector 140, between origin 110 and fiducial marker 30, can be determined. From vector 140 and the determined orientation of the fiducial marker/two-dimensional barcode relative to robot 18, the pose (position and orientation) defined by a quaternion (x, y, z, w) for fiducial marker 30 can be determined.

Figure 5:
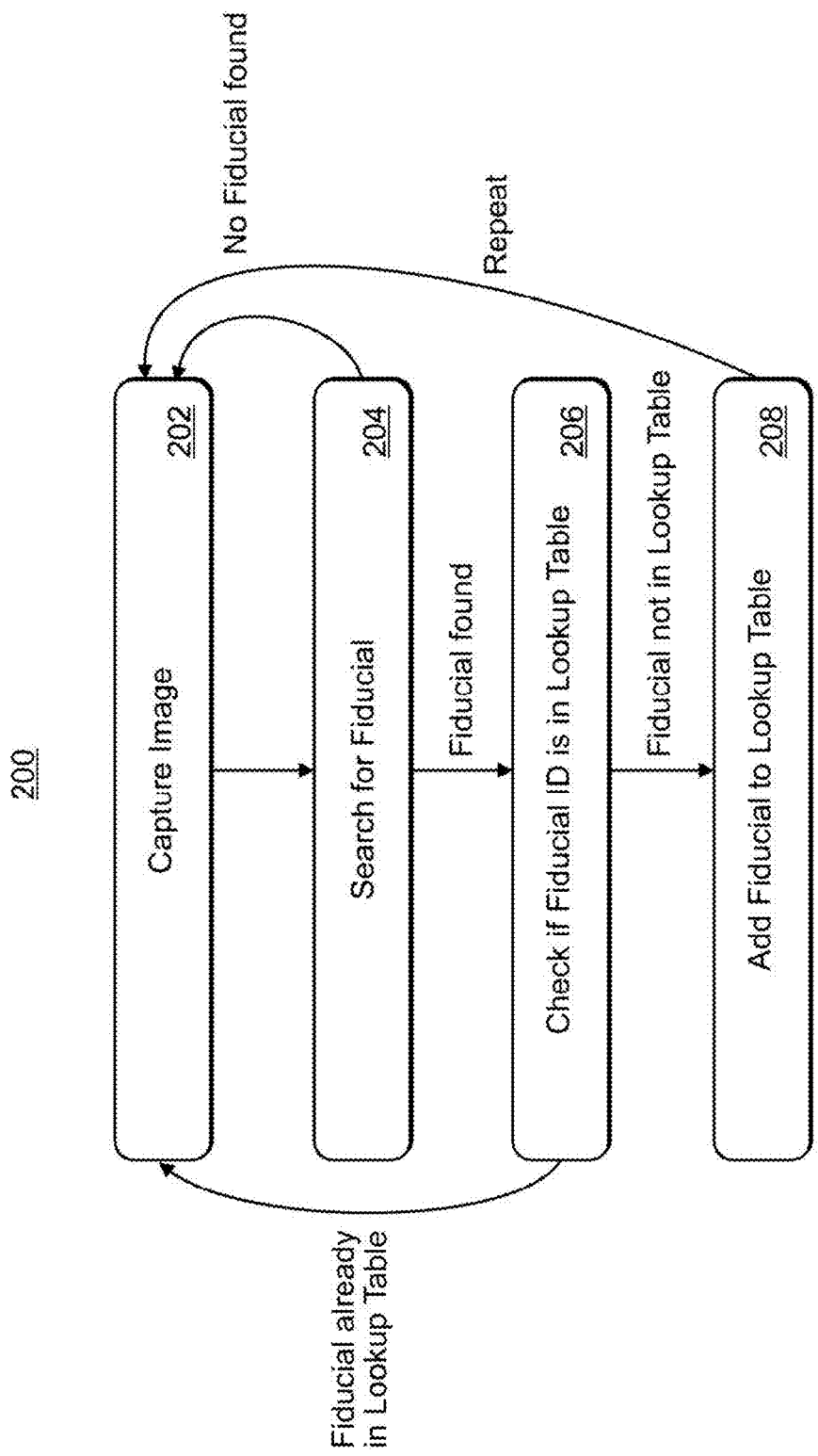
FIG. 5 is a flow chart depicting the process for locating fiducial markers dispersed throughout the warehouse and storing fiducial marker poses.

Flow chart 200, FIG. 5, describing the fiducial marker location process is described. This is performed in an initial mapping mode and as robot 18 encounters new fiducial markers in the warehouse while performing picking, placing and/or other tasks. In step 202, robot 18 using camera 26 captures an image and in step 204 searches for fiducial markers within the captured images. In step 206, if a fiducial marker is found in the image (step 204) it is determined if the fiducial marker is already stored in fiducial table 300, FIG. 6, which is located in memory 34 of robot 18. If the fiducial information is stored in memory already, the flow chart returns to step 202 to capture another image. If it is not in memory, the pose is determined according to the process described above and in step 208, it is added to fiducial to pose lookup table 300.

In look-up table 300, which may be stored in the memory of each robot, there are included for each fiducial marker a fiducial identification, 1, 2, 3, etc., and a pose for the fiducial marker/bar code associated with each fiducial identification. The pose consists of the x,y,z coordinates in the warehouse along with the orientation or the quaternion (x,y,z, ω).

In another look-up Table 400, FIG. 7, which may also be stored in the memory of each robot, is a listing of bin locations (e.g. 402a-f) within warehouse 10, which are correlated to particular fiducial ID's 404, e.g. number "11". The bin locations, in this example, consist of seven alpha-numeric characters. The first six characters (e.g. L01001) pertain to the shelf location within the warehouse and the last character (e.g. A-F) identifies the particular bin at the shelf location. In this example, there are six different bin locations associated with fiducial ID "11". There may be one or more bins associated with each fiducial ID/marker.

The alpha-numeric bin locations are understandable to humans, e.g. operator 50, FIG. 3, as corresponding to a physical location in the warehouse 10 where items are stored. However, they do not have meaning to robot 18. By mapping the locations to fiducial ID's, Robot 18 can determine the pose of the fiducial ID using the information in table 300, FIG. 6, and then navigate to the pose, as described herein.

Figure 8:
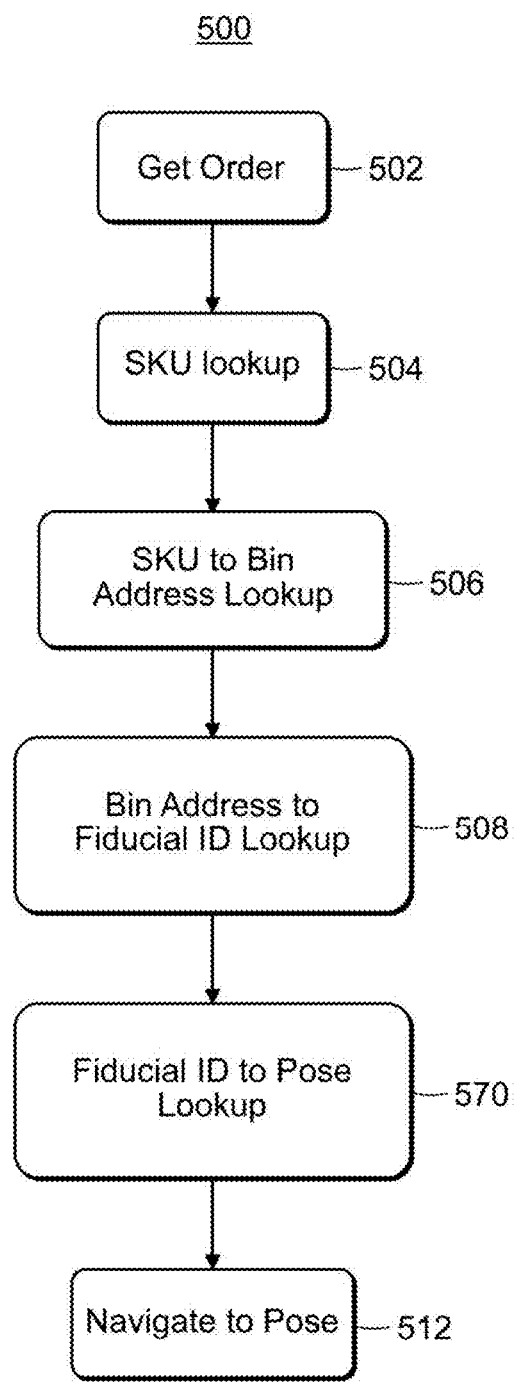
FIG. 8 is a flow chart depicting product SKU to pose mapping process.

The order fulfillment process according to this invention is depicted in flow chart 500, FIG. 8. In step 502, from warehouse management system 15, order server 14 obtains an order, which may consist of one or more items to be retrieved. It should be noted that the order assignment process is fairly complex and goes beyond the scope of this disclosure. One such order assignment process is described in commonly owned U.S. patent application Ser. No. 15/807,672, entitled Order Grouping in Warehouse Order Fulfillment Operations, filed on Sep. 1, 2016, which is incorporated herein by reference in its entirety. It should also be noted that robots may have tote arrays which allow a single robot to execute multiple orders, one per bin or compartment. Examples of such tote arrays are described in U.S. patent application Ser. No. 15/254,321, entitled Item Storage Array for Mobile Base in Robot Assisted Order-Fulfillment Operations, filed on Sep. 1, 2016, which is incorporated herein by reference in its entirety.

Continuing to refer to FIG. 8, in step 504 the SKU number(s) of the items is/are determined by the warehouse management system 15, and from the SKU number(s), the bin location(s) is/are determined in step 506. A list of bin locations for the order is then transmitted to robot 18. In step 508, robot 18 correlates the bin locations to fiducial ID's and from the fiducial ID's, the pose of each fiducial ID is obtained in step 510. In step 512 the robot 18 navigates to the pose as shown in FIG. 3, where an operator can pick the item to be retrieved from the appropriate bin and place it on the robot.

Item specific information, such as SKU number and bin location, obtained by the warehouse management system 15/order server 14, can be transmitted to tablet 48 on robot 18 so that the operator 50 can be informed of the particular items to be retrieved when the robot arrives at each fiducial marker location.

With the SLAM map and the pose of the fiducial ID's known, robot 18 can readily navigate to any one of the fiducial ID's using various robot navigation techniques. The preferred approach involves setting an initial route to the fiducial marker pose given the knowledge of the open space 112 in the warehouse 10 and the walls 114, shelves (such as shelf 12) and other obstacles 116. As the robot begins to traverse the warehouse using its laser radar 26, it determines if there are any obstacles in its path, either fixed or dynamic, such as other robots 18 and/or operators 50, and iteratively updates its path to the pose of the fiducial marker. The robot re-plans its route about once every 50 milliseconds, constantly searching for the most efficient and effective path while avoiding obstacles.

With the product SKU/fiducial ID to fiducial pose mapping technique combined with the SLAM navigation technique both described herein, robots 18 are able to very efficiently and effectively navigate the warehouse space without having to use more complex navigation approaches typically used which involve grid lines and intermediate fiducial markers to determine location within the warehouse.

Item Storage Arrays

As described above, a storage array having two or more totes or containers which are affixed to one another or a single unit having multiple compartments may be used to increase efficiency. The terms totes, containers, and compartments (among other terms described above) may be used interchangeably herein. One embodiment of the storage array according to this invention is described with regard to FIG. 10A. Robot 18a is shown to include an upper surface 36a of a wheeled base 20a. There is an armature 40a which at a first end is connected to wheeled base 20a (connection not visible in this view) and at its other end it connects to tablet holder 46a for supporting a tablet 48a. Unlike armature 40, FIG. 3, armature 40a does not include a tote-holder 42 for carrying a tote 44 that receives items. Instead, the storage array 44a is placed on upper surface 36a of wheeled base 20a.

In this embodiment, storage array 44a includes three storage containers 602, 604, and 606, which are vertically stacked upon each other and are fixedly interconnected to form an integrated array. Each container 602, 604, and 606 in storage array 44a includes a bar code disposed on bar code labels 612, 614, and 616, respectively. Also on each bar code label is a number associated with each container, which may be read by a human operator, such as operator 50a, FIG. 11, to identify the different containers. The numbers in this example are "T81001", "T81002", and "T81003" associated with containers 602, 604, and 606, respectively. In order to make it easier to distinguish among the containers, they may be colored differently. For example, container 602, may be colored blue in whole or in part. Container 604, may be colored yellow in whole or in part and container 606, may be colored green in whole or in part.

In addition, there is included a bar code label 620, which is associated with the storage array 44a. The bar code label 620 also includes a storage array identification number, in this case "001", for the operator 50a to identify it among the various storage arrays. Bar code label 620 is positioned on a side of container 602, but this label could be positioned in various locations on the storage array.

Figure 10A:
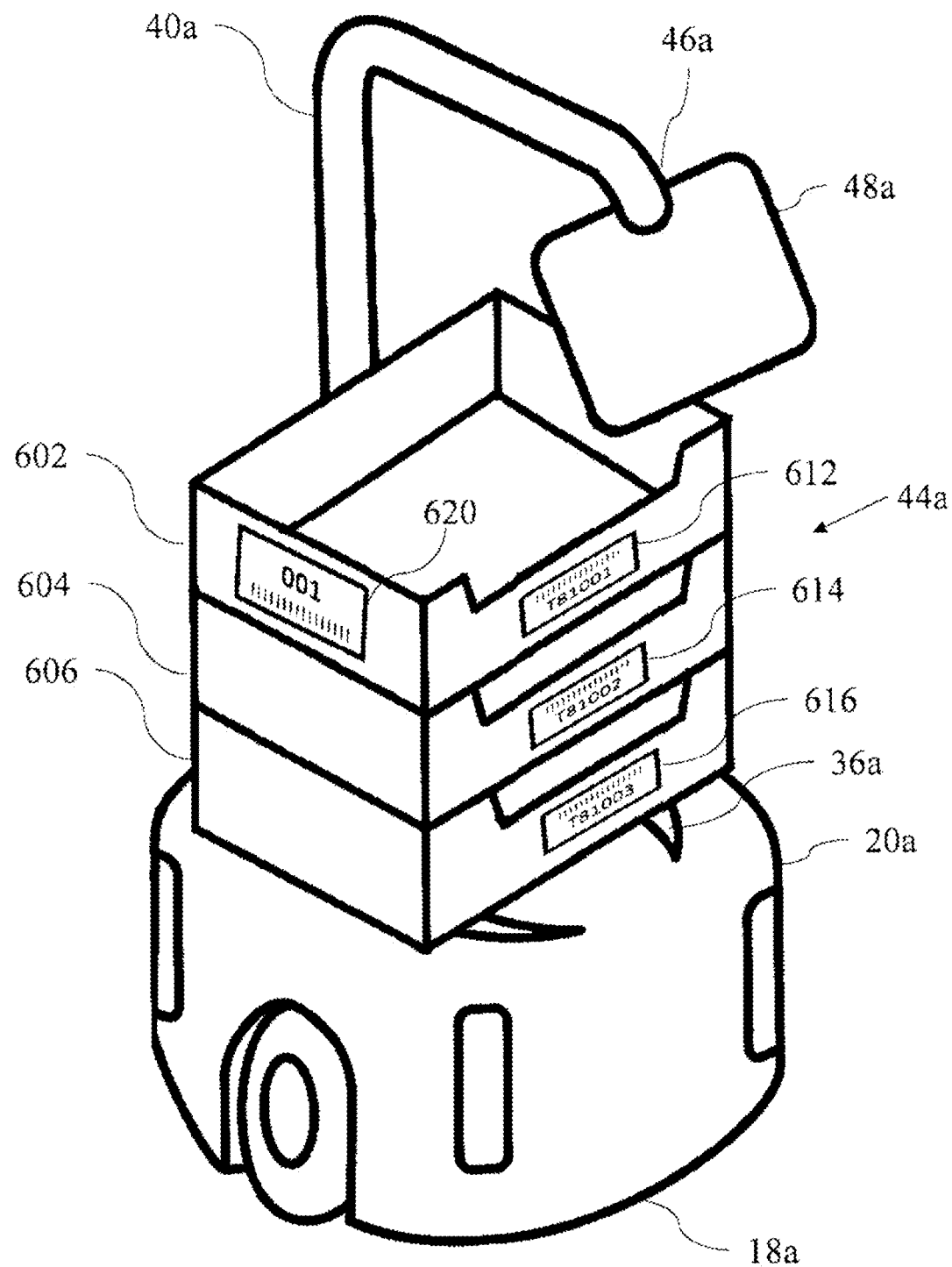
FIG. 10A is a perspective view of a robot outfitted with an armature and a storage array according to the invention.
Figure 10B:
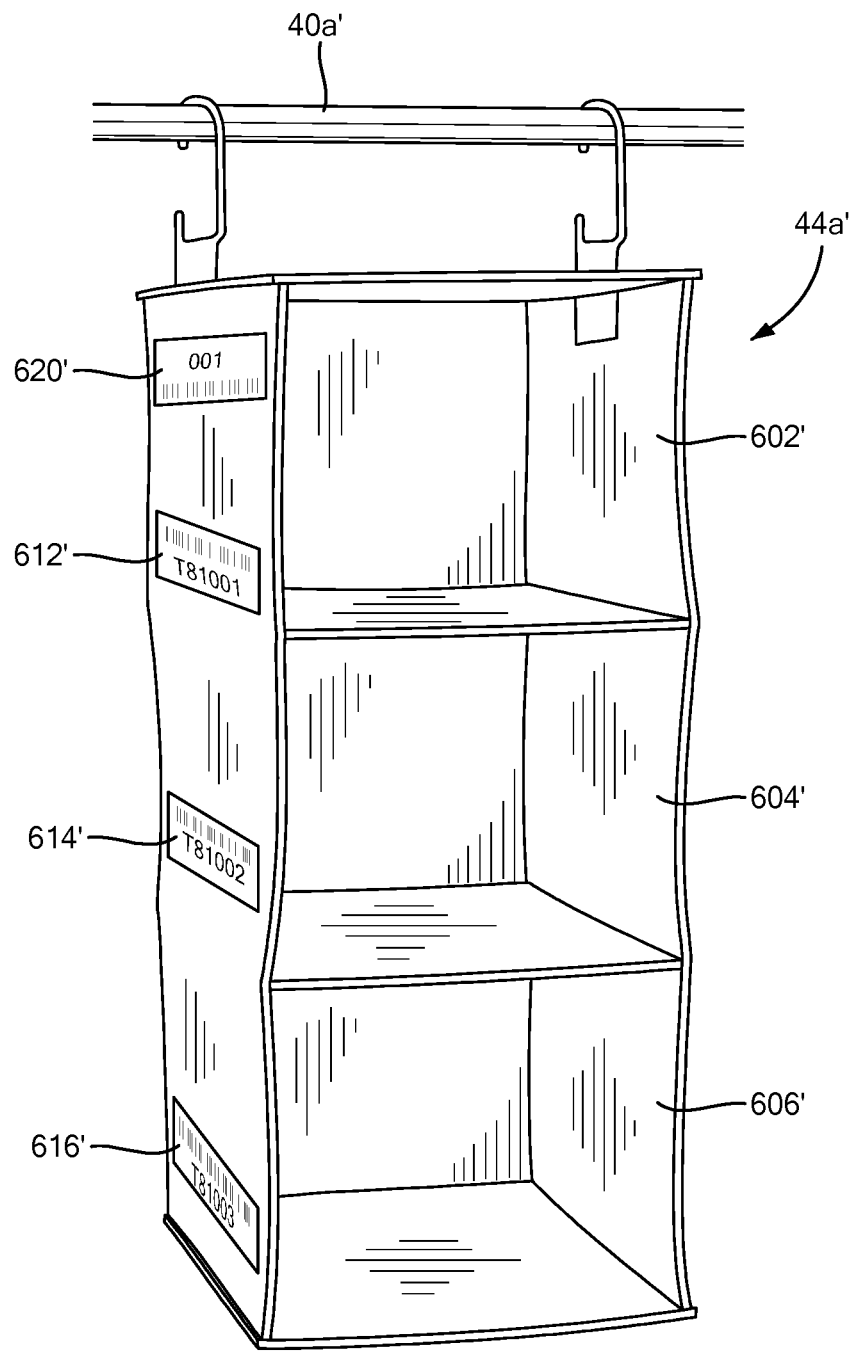
FIG. 10B is a perspective view of another embodiment of a storage array according to the invention.

Alternatively, a holder may be included on the armature 40a to support storage array 44a. It should be noted that any other storage array configurations, including one hanging from the armature above surface 36a of robot 18a could be used, such as storage array 44a' as depicted in FIG. 10B. Components of FIG. 10B which are comparable to those in FIG. 10A are show with a prime (') symbol. In both cases, the storage array is removable so that various types of storage arrays can be used with all of the robots 18a being utilized in a warehouse.

An operator may initiate a "pick" process with a robot by inducting it into the system and providing notification to warehouse management system ("WMS") 15 that robot 18a is available to receive and execute an order. In the induction process, the operator may interact with the robot 18a via a touch screen on the tablet 48a of the robot or via a handheld wireless device to activate it. The robot then communicates to WMS 15 that it is ready to receive its order session. The operator also provides robot 18a with a storage array, such as storage array 44a.

Rather than inducting each container 602, 604, and 606 individually and obtaining an order for each serially by scanning the bar code labels 612, 614, and 616 for each container, the operator may scan only bar code label 620, associated with storage array 44a, in order to efficiently generate the orders for all three individual containers. This process is described with respect to flow chart 650, FIG. 12.

The process of flow chart 650 begins when an operator scans a bar code 620 of an item storage array at step 652, in this example it is bar code label 620 which has an identification number 001. The identification is transmitted to the WMS 15 which then obtains one or more characteristics of the particular storage array which will be used to assign the order(s).

A table 660, FIG. 13, is stored in WMS 15 and contains the characteristics of item storage array 44a shown at array identification 662, as well as the characteristics of all of the item storage arrays available for use in the warehouse. The characteristics may include, for example, the number of compartments in the storage array, the compartment ID numbers, the compartment colors, and the compartment size. For item storage array 44a, the number of compartments, i.e. 3, is found at location 664 in table 660 and the compartment ID numbers "T81001", "T81002", and "T81003" associated with containers 602, 604, and 606, respectively, are found at location 666. The compartment colors (e.g. blue, yellow and green) may be found at location 668 and the compartment size (e.g. dimensions Ain.×Bin.× Cin.) may be found at location 670. Rather than storing the actual dimensions a code indicative of the size of the compartments may be stored. All of the compartments of a particular storage array may have the same size or they may be sized differently.

Figure 12:
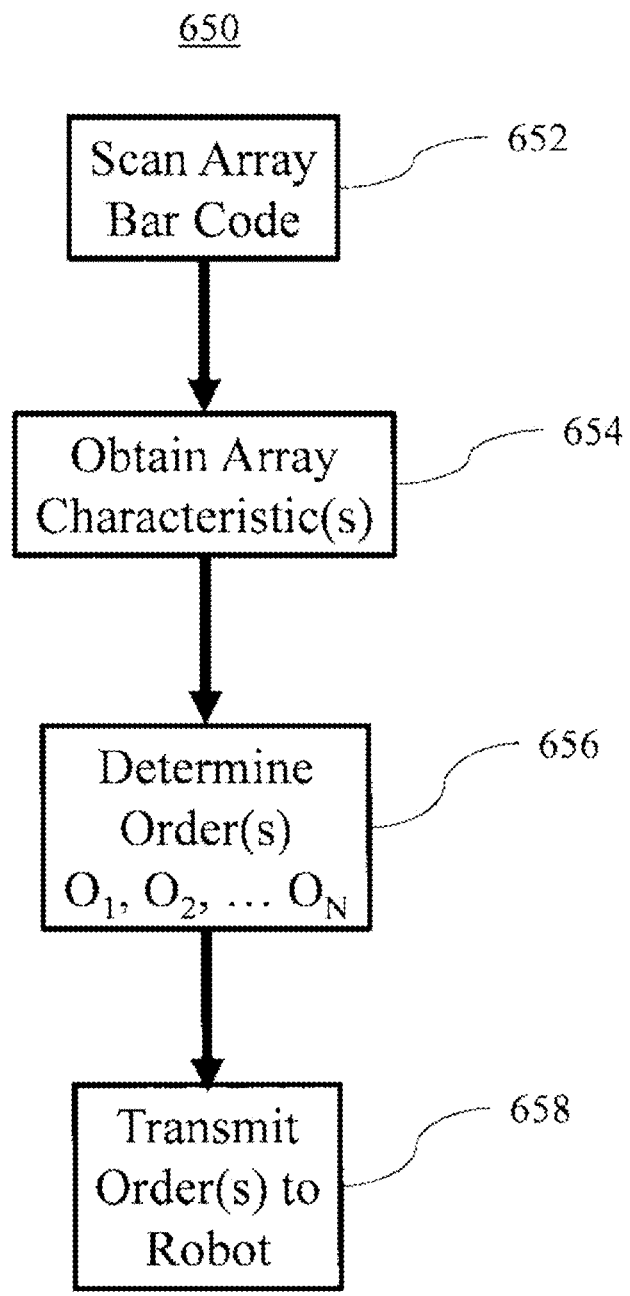
FIG. 12 is a flow chart depicting the robot induction process according to the invention for a robot carrying a storage array.

Referring again to flow chart 650, FIG. 12, at step 656 using at least one characteristic of the storage array, the orders, $O_1, O_2, \ldots O_N$, are determined and at step 658, the orders are transmitted to robot 18a. In the simplest implementation, the characteristic used to determine the orders may be only the number of containers in the array. With storage array 44a, the WMS 15 will know from table 660, FIG. 13, that there are three containers and it may then select the next three orders, $O_1$, $O_2$, and $O_3$, from a "pick" queue (i.e. a queue of pick orders assigned priority by the WMS 15 based on certain predetermined criteria) and assign them to compartments T81001, T81002, and T81003 associated with containers 602, 604, and 606, respectively. Also, transmitted (or previously stored) would be the color coding and the ID numbers associated with each container/compartment. The orders to be assigned may also be aggregated based on the location of the items in the warehouse, or by using other criteria, which means that they may be picked in a different order than sequentially from the queue.

Of course, other characteristics could be used along with the number of containers to assign orders. For example, compartment size could be used as well to pair the size of items in an order with the size of the containers available. In this case, the orders may not be selected sequentially from the "pick" queue, but may be picked out of order to better match items to the compartments based on size. Table 660 in FIG. 13 is shown to have a curved line adjacent to the column for container size to indicate that additional columns, describing additional characteristics of the storage arrays, may be included.

Once robot 18a has received its orders for storage array it navigates to a location in the warehouse to begin execution of its pick orders. Robot 18a may use a route optimization approach to determine the order of the picks from the three orders received. This may result in picks for different orders interleaved between stops rather than sequentially picking for $O_1$, then $O_2$ and finally $O_3$. For the items to be picked, the order from the WMS 15 will include the product SKU. As described above, from the SKU, the robot 18a determines the bin number/location, such as location 630, FIG. 11, where the product is located in the warehouse. Robot 18a then correlates the bin location to a fiducial ID (see FIG. 7) and from the fiducial ID, the pose associated with the product SKU is determined and the robot navigates to the pose.

Figure 11:
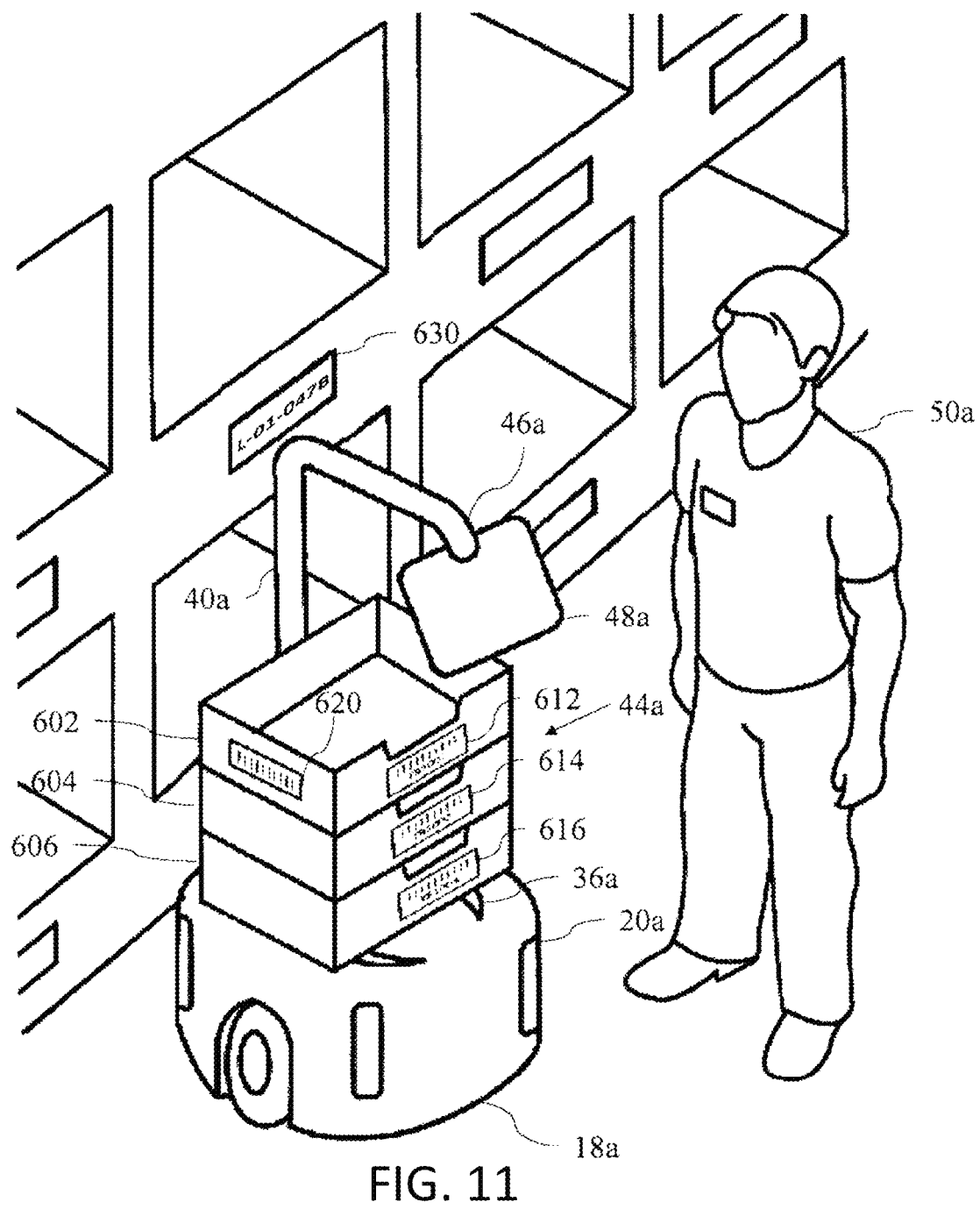
FIG. 11 is a perspective view of the robot and storage array of FIG. 10A parked in front of a shelf.
Figure 14:
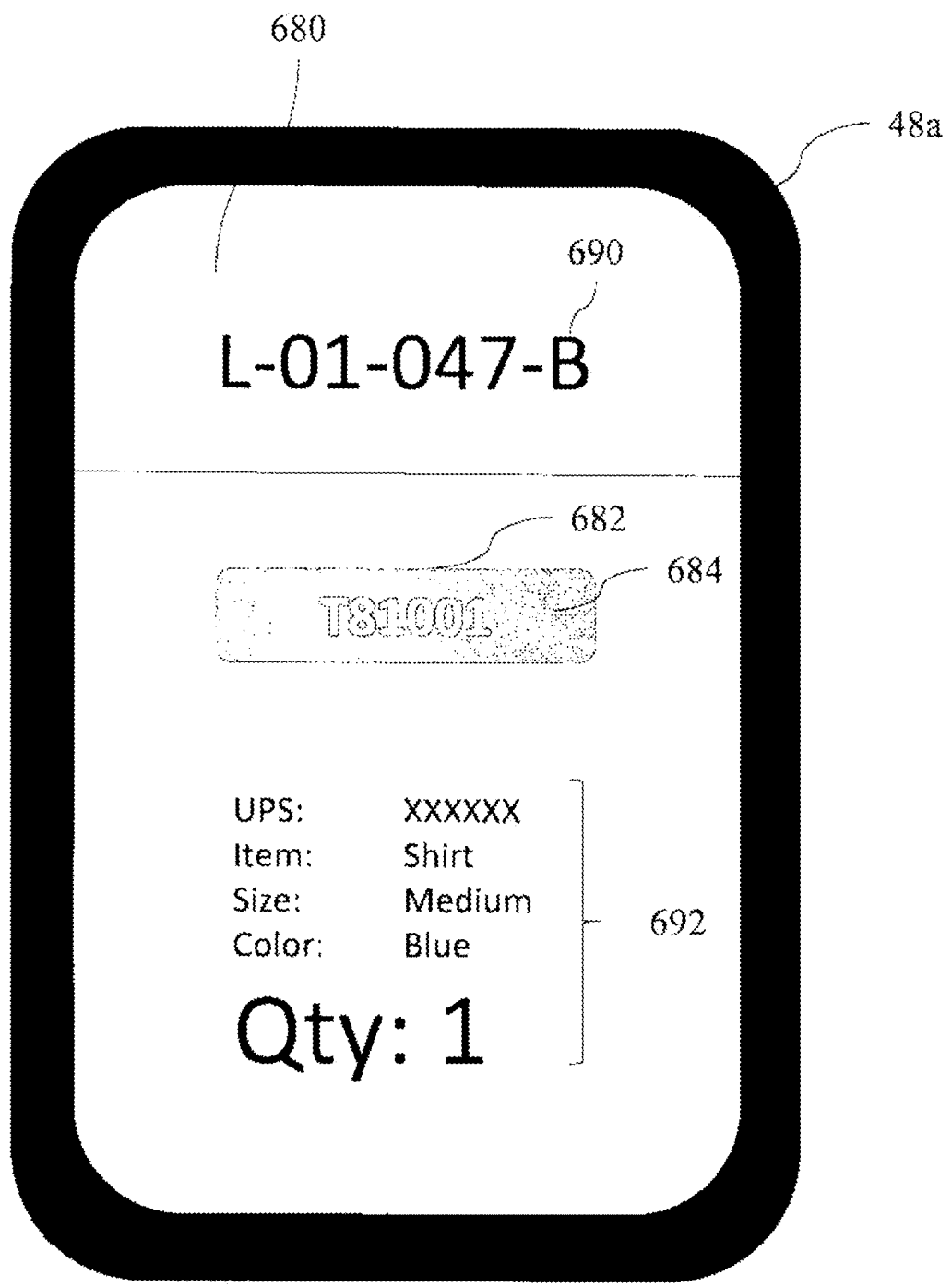
FIG. 14 is a view of the display of the tablet of the robot shown in FIGS. 10A and 11.
Figure 15A:
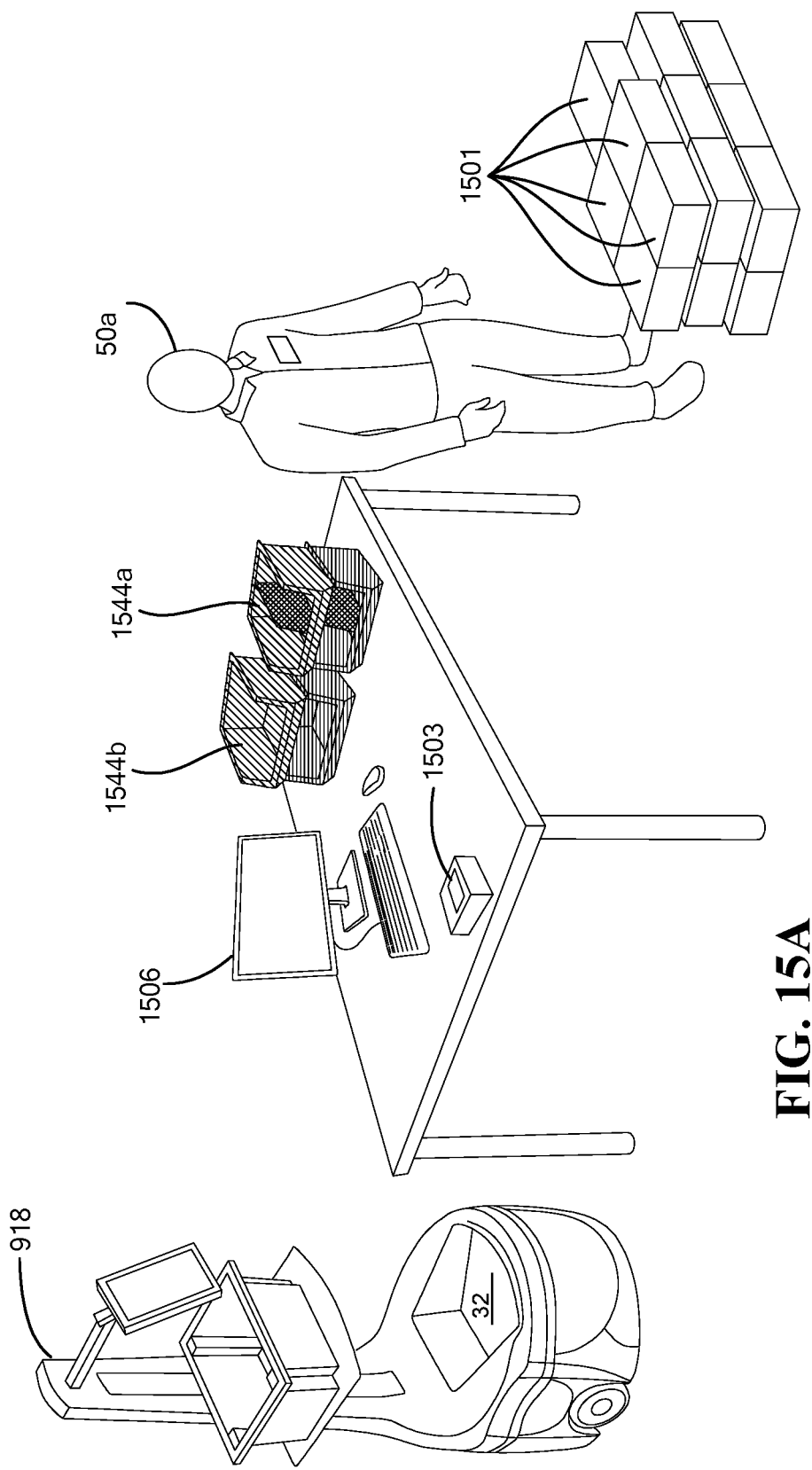
FIG. 15A is a perspective view of a staging area in accordance with various embodiments.
Figure 15B:
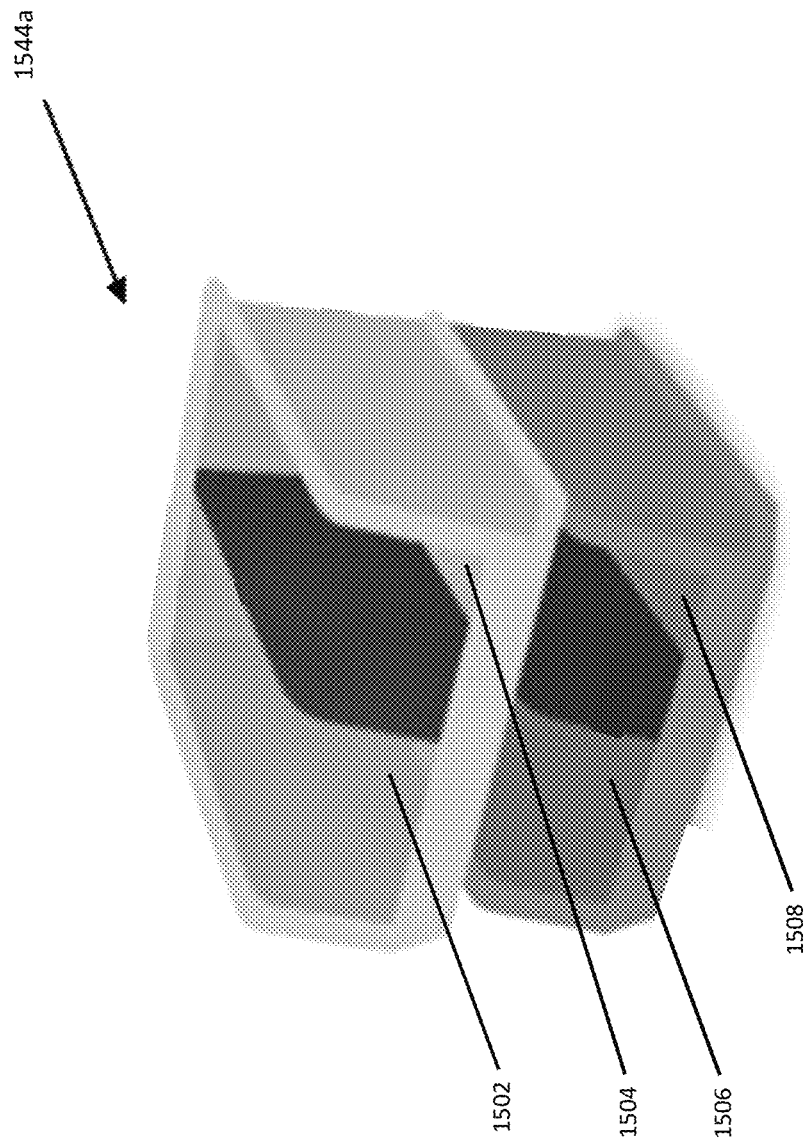
FIG. 15B is a perspective view of a four-container storage array in accordance with various embodiments.
Figure 15C:
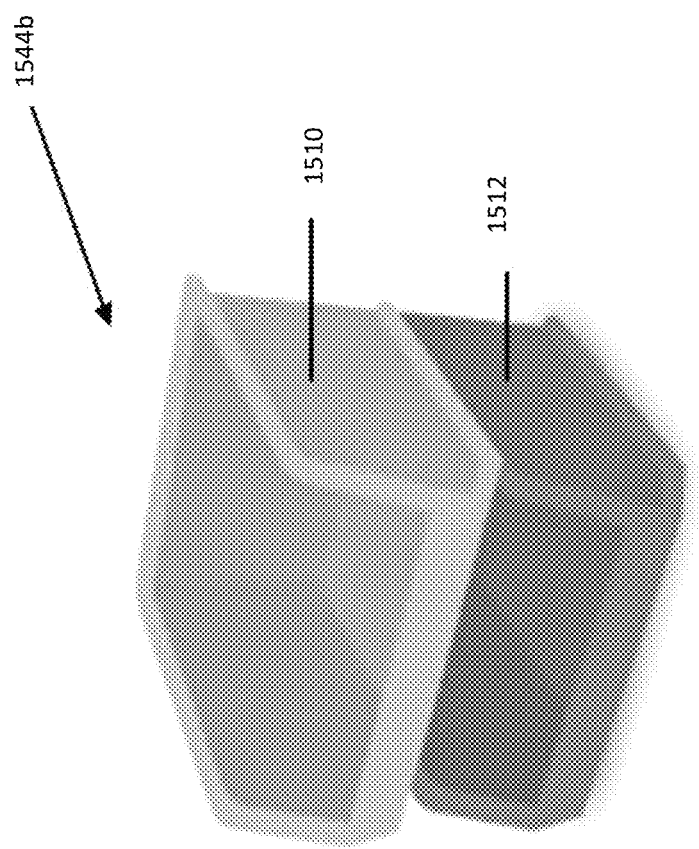
FIG. 15C is a perspective view of a two-container storage array in accordance with various embodiments.

Once at a location, such as the location shown in FIG. 11, the robot 18a may communicate the pick task to operator 50a via tablet 48a. As depicted in FIG. 14, the display 680 of tablet 48a shows the container number "T81001" at location 682, which corresponds to container 602 of storage array 44a. This tells the operator that the item to be picked needs to be placed in this container. In addition, although not visible in this black and white drawing, the color of area 684 surrounding the container number corresponds to the color of the container to make it even easier for operator 50 to know where the item is to be placed. In this example, region 684 is colored blue to indicate that container 602 ("T8001") is also colored blue.

At location 690 on display 680, the bin location, in this case "L-01-047-B", which corresponds to bin location 630 in FIG. 11 proximate robot 18a is displayed for operator 50a to read. Also on display 680 is the item, in this case a "shirt", size "medium", color "blue" and quantity "1". The UPC code may also be provided for the operator to verify an exact item match. From this information, the operator can readily locate the item in the identified bin location and place it in the proper container in the storage array 44a.

With the above described storage array 44a, having interconnected containers forming an integrated array, not only makes the induction and order assignment process more efficient and streamlined it also makes correcting operator errors easier and more straightforward. A common error that can occur is placing an item in the wrong container. With multiple individual containers, as opposed to interconnected/integrated storage arrays, an item placed in an incorrect container becomes more difficult to reconnect to the correct container as the containers move throughout the process and become separated. With the storage array 44a according to this invention, the interconnected containers stay together throughout the process making it easier to correct errors among the interconnected containers.

Execution of Robot-Assisted Putaway

In some embodiments, to the extent that items for putaway have been previously identified and entered into a "putaway" queue in the WMS 15, instead of executing a series of "pick" orders for each of the containers in the storage array, the storage array 44a may be loaded with items by the operator when the order includes "place" ("putaway") tasks for each of the containers. When an operator scans a bar code of an item storage array 44a at step 652, FIG. 12, the identification is transmitted to WMS 15, which then obtains one or more characteristics of the particular storage array 44a to assign the order(s). However, in this case the orders generated are for items to be placed (put away), which the WMS 15 retrieves from the "putaway" queue and assigns them to the individual containers 602, 604, and 606 in the same manner as described above based on one or more characteristics of the storage array 44a. This order information is provided to the operator via the tablet display and the operator loads the containers 602, 604, and 606 according to the orders generated. The putaway orders are executed in a manner corresponding to the pick orders described above.

However, as explained above, when, for example, online orders are returned to a warehouse or mixed new inventory is delivered, a large number of mixed, unsorted items can pile up at a receiving dock for subsequent putaway. Conventionally, putaway methodologies require that the unsorted items be put away on a first-come first-served basis, wherein carts or totes are just loaded with a series of positionally dispersed items and then human pickers are sent along in highly disorganized and inefficient travel routing in order to execute the putaway tasks. Thus conventional putaway is a time consuming, cost inefficient, and physically demanding operation.

Referring now to FIGS. 9 and 15A-C, in some embodiments, a plurality of unsorted items 1501 for putaway can be located in a staging area 901 (e.g., a loading dock, a delivery area, a storage area, a dedicated presorting area, or any other suitable location). An operator can scan each of the unsorted items 1501 with a scanning device 1503 for loading into a container 1502, 1504, 1506, 1508, 1510, 1512 of a storage array 1544a, 1544b on a first-come first-served basis. In such embodiments, loading can be performed by the user scanning an item identifier of an item for putaway, scanning a container identifier associated with one of the containers 1502, 1504, 1506, 1508, 1510, 1512 to associate the item therewith, and placing the item into the associated container 1502, 1504, 1506, 1508, 1510, 1512.

Identifier, whether an "item identifier," a "container identifier," or an "array identifier" as used herein, refers to any scannable (interchangably "readable") marking, label, or device associated with identifying information corresponding to the item, container, or array. For example, identifiers can take the form of a 1-d or 2-d barcode marking printed, etched, engraved, etc. on the item (or packaging thereof), container, or array. Such identifiers may take the form of a label attached to the item (or packaging thereof), container, or array and including a 1-d or 2-d barcode or an RFID chip.

Such identifiers may also or alternatively include an RFID chip embedded within the item (or packaging thereof), container, or array itself.

The identifier, in some embodiments, may be correlated to identifying information as simple as a UPC code or SKU. However, in a warehouse environment, the identifier may include more complex identifying information. For example, in some embodiments, the identifier may be a "license plate" storing unique information corresponding to the individual item, container, or array scanned/read by the scanner. As will be apparent to one of ordinary skill in the art in view of this disclosure, license plates can be serialized identifiers associated with information such as, for example, part numbers, UPC or SKU number, name, quantity, revision, serial number, date of manufacture, expiration date, lot number, geographic location and location history, locations for stocking this product within the current warehouse or facility, inventory status, sub-inventory, history of which organizations/companies have touched the item, container, or array, history of which employees at each organization have handled the item, container, or array, combinations thereof, and any other desired product information.

When the identifier used is a license plate, the mapping process to determine the pose in the warehouse to place the item may be simplified by mapping from the warehouse stocking location (rather than the SKU) contained in the license plate information to the pose. When mapping from the SKU, such as in connection with the picking process, described above with regard to FIG. 8, in step 504 the SKU number(s) of the items is/are determined by the warehouse management system 15, and from the SKU number(s), the bin location(s) is/are determined in step 506. Instead of mapping from the SKU to the bin location, the process may begin with the bin location directly. From the bin location, robot 18 may determine the fiducial ID's and from the fiducial ID's, the pose of each fiducial ID may be obtained.

Once an item has been assigned to at least one of the containers 1502, 1504, 1506, 1508, 1510, 1512 of the storage array 1544a, 1544b, the operator (or a different operator) can then scan an array identifier associated with the entire storage array 1544a, 1544b and induct the array onto a robot 918 as described above. The robot 918 can then be dispatched to the warehouse and the putaway orders can be executed in a manner corresponding to the pick orders described above. In this manner, the robot 918 avoids downtime by being free to execute other picking or putaway operations during loading of the storage array 1544a, 1544b, only being occupied during active putaway operation. Furthermore, by providing robot-assisted putaway tasks, mitigates personnel and equipment usage inefficiencies by permitting putaway execution with a minimum of item preprocessing, minimal robot downtime, and permitting the robot, rather than human pickers, to traverse the necessary route to execute the putaway tasks associated with the storage array 1544a, 1544b. In this manner, human pickers can remain on the warehouse floor and continue servicing robots as usual, without a need to walk to the staging area 901 (e.g., a loading dock, a delivery area, a storage area, a dedicated presorting area, or any other suitable location) and without a need for the human operator to travel specialized, inefficient routes to execute putaway tasks.

Presorting for Executing Robot-Assisted Putaway Tasks

Figure 16:
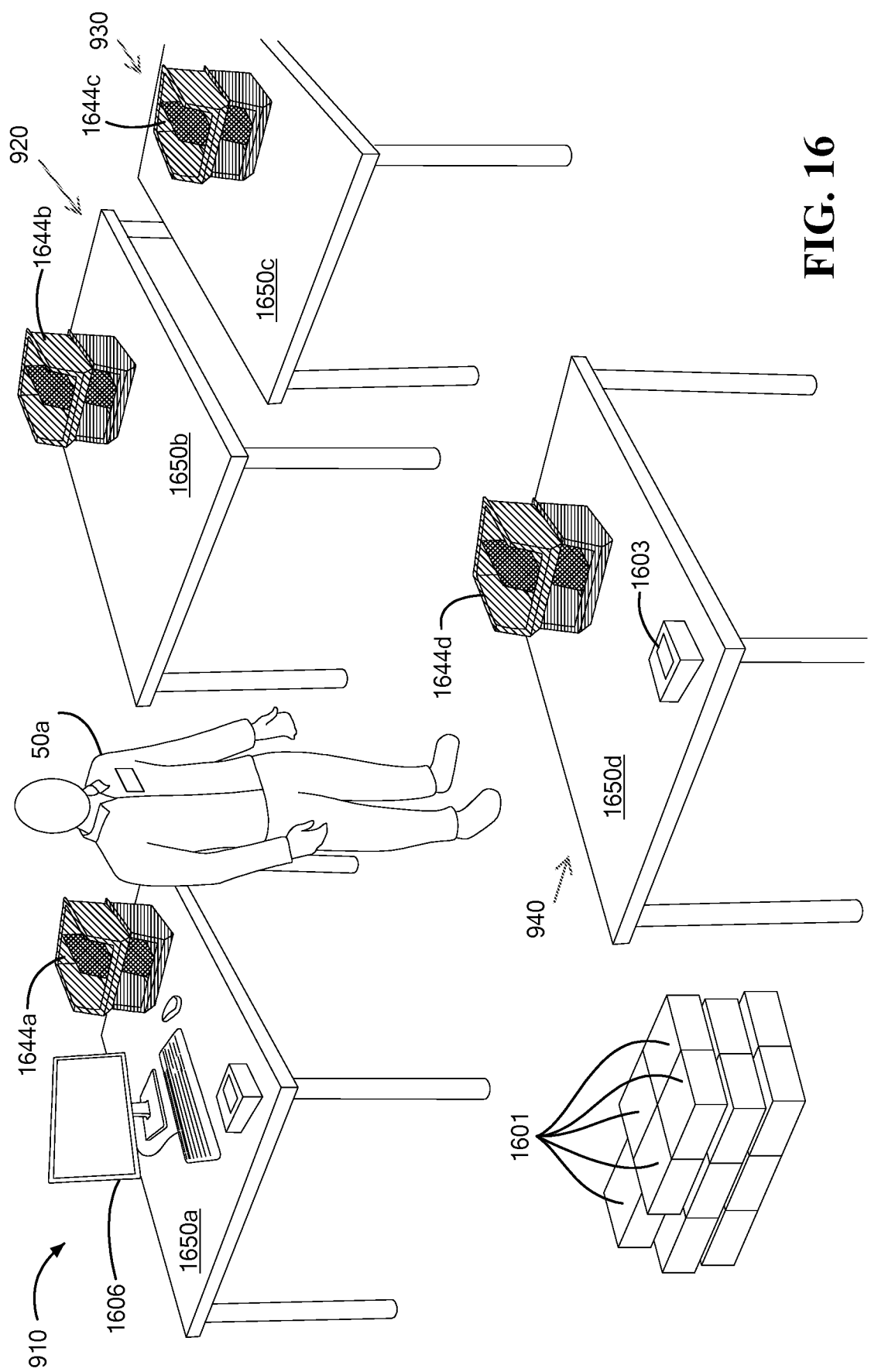
FIG. 16 is a perspective view of a presorting and staging area in accordance with various embodiments.

The presorting system for executing robot-assisted putaway tasks (also referred to as "place" tasks) provided herein further mitigates routing, equipment, and personnel usage inefficiencies by presorting the unsorted items during loading of the items into the containers. In particular, further efficiencies can be achieved by more efficiently presorting items for putaway via grouping by location within the warehouse. Referring now to FIG. 16, in some embodiments, each presorted item or group of items can be assigned to a container of a corresponding zone-specific storage array 1644a-d. Each storage array can be assigned to a robot 18a, and, when the storage array 1644a-d is full or otherwise ready for deployment, the robot 18a can be dispatched into the warehouse and the putaway tasks assigned to each container can be executed by the robot and operators in the manner described above with reference to pick and place operations.

Although the storage arrays 44a, 1544a, 1544b, 1644a-d are shown and described herein as horizontally oriented stacked totes 44a, 1544b and/or stacked divided totes 1544a, 1644a-d configured for top loading, it will be apparent in view of this disclosure that any style or configuration of storage array, or combination thereof, can be used in accordance with various embodiments. For example, in some embodiments, a vertically oriented "cubby" style array having openings on a vertical surface thereof for front/rear/side loading can be disposed on, hung from, or otherwise be removably attached to the robot 18a. In some embodiments, such arrays can be, for example, similar to storage array 44a' shown in FIG. 10B. In some embodiments, the robot 18a can include a shelf or other horizontal surface positioned above the upper surface of the wheeled base 20 of the robot 18a. In some embodiments, such a shelf can be divided into a plurality of containers.

Figure 9:
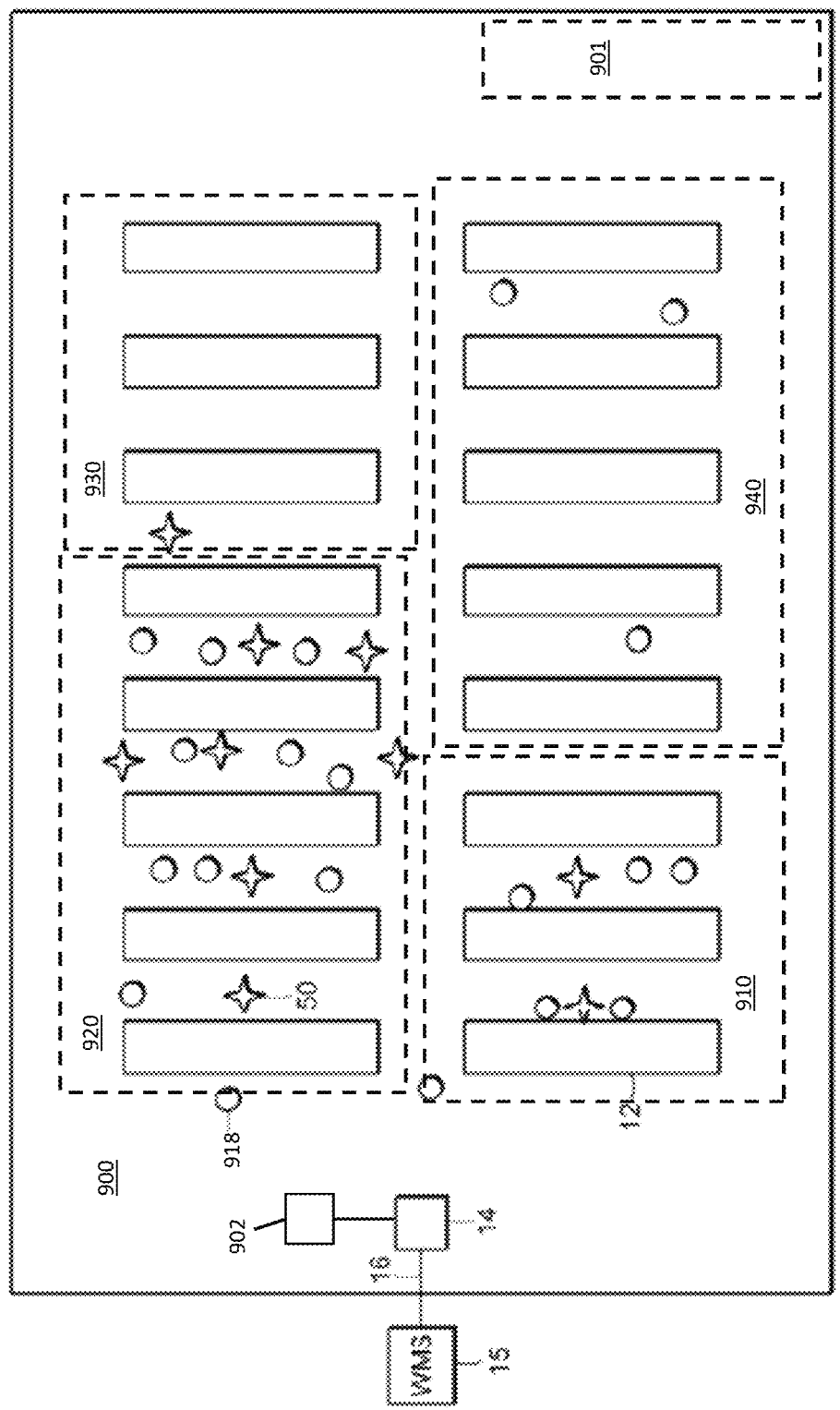
FIG. 9 is a top plan view of an order-fulfillment warehouse having a staging area and a plurality of putaway zones in accordance with various embodiments.

Referring now to FIGS. 9 and 16, unsorted items 1601 can be located at a staging area 901 in a warehouse 900 for presorting of the unsorted items 1601. A plurality of zone-specific storage arrays 1644a-d, each having a plurality of containers thereon, can be located in or proximate to the staging area 901 for assignment of the unsorted items 1601 thereto. Zones 910, 920, 930, 940 of the warehouse 900 can be stored in a memory of a centralized server such as the WMS 15, the order server 14, or any other server 902 storing warehouse information and represent a localized subset of all storage locations (e.g., bin locations) within the warehouse, such that each of the subset of storage locations is correlated in the memory of the WMS 15, the order server 14, or any other server 902 with its respective zone 910, 920, 930, 940. To facilitate presorting, upon scanning of the unsorted items 1601 by a scanner 1603, the scanner 1603 and/or a workstation computer 1606 can display a zone 910, 920, 930, 940 corresponding to the storage location of the scanned item. The operator can then load the item into a container of one of the zone-specific storage arrays 1644a-d associated with the displayed zone as described above with reference to FIG. 15.

As noted above, the zone-specific storage arrays 1644a-d can each be assigned in the staging area 901 to a specific one of the zones 910, 920, 930, 940. In some embodiments, the zone assignment can be as simple as placing the respective zone-specific storage arrays 1644a-d in a loading location 1650a-d labeled for a particular zone as shown in FIG. 16. For example, as shown in FIG. 16, zone-specific storage array 1644a is positioned in loading location 1650a, which is designated for zone 910. Similarly, zone-specific storage array 1644b is positioned in loading location 1650b, which is designated for zone 920, zone-specific storage array 1644c is positioned in loading location 1650c, which is designated for zone 930, and zone-specific storage array 1644d is positioned in loading location 1650d, which is designated for zone 940.

To the extent that it is desired for the WMS 15, the order server 14, or the any other server 902 to determine the zone-assignment for each storage array 1644a-d, the operator can use a scanning device 1603 to scan the array identifier associated with the entire storage array 1644a-d and, via the scanning device 1603 and/or a workstation computer 1606, assign the storage array 1644a-d to a particular zone 910, 920, 930, 940.

Alternatively, in some embodiments, upon loading of a first item into a first container of one of the storage arrays 1644a-d, at least one of the scanning device 1603, the workstation computer 1606, the WMS 15, the order server 14, or the any other server 902 can correlate, in a memory thereof, that particular storage array 1644a-d with the zone 910, 920, 930, 940 associated with the storage location of the first item. Thus, the storage array 1644a-d into which the item is placed will be automatically assigned to the zone 910, 920, 930, 940 corresponding to the item storage location of the item. The scanner 1603 and/or the workstation computer 1606 can then, for subsequently scanned items associated with the assigned zone 910, 920, 930, 940, display an identification of that particular storage array and/or a particular recommended container, rather than or in addition to displaying the zone 910, 920, 930, 940 itself.

Similar to the robot-assisted putaway described above with reference to FIG. 15, upon loading of at least one item in to a respective one of the containers of one of the storage arrays 1644a-d, the storage array 1644a-d can then be inducted onto a robot 918. The robot 918 can then be dispatched to the warehouse and the putaway orders can be executed in a manner corresponding to the pick orders described above.

Because the putaway tasks are presorted by zone, the robot 918 can follow a comparatively efficient, localized travel path, rather than potentially routing to various disparate locations throughout the warehouse. Thus the presorting system for executing robot-assisted putaway tasks of this application reduces inefficient wasted travel time and, by extension, wasted battery charging time for the robot 918. The presorting system for executing robot-assisted putaway tasks also eliminates any need for human operators 50 to disrupt ordinary picking and placing activities.

Non-Limiting Example Computing Devices

Figure 17:
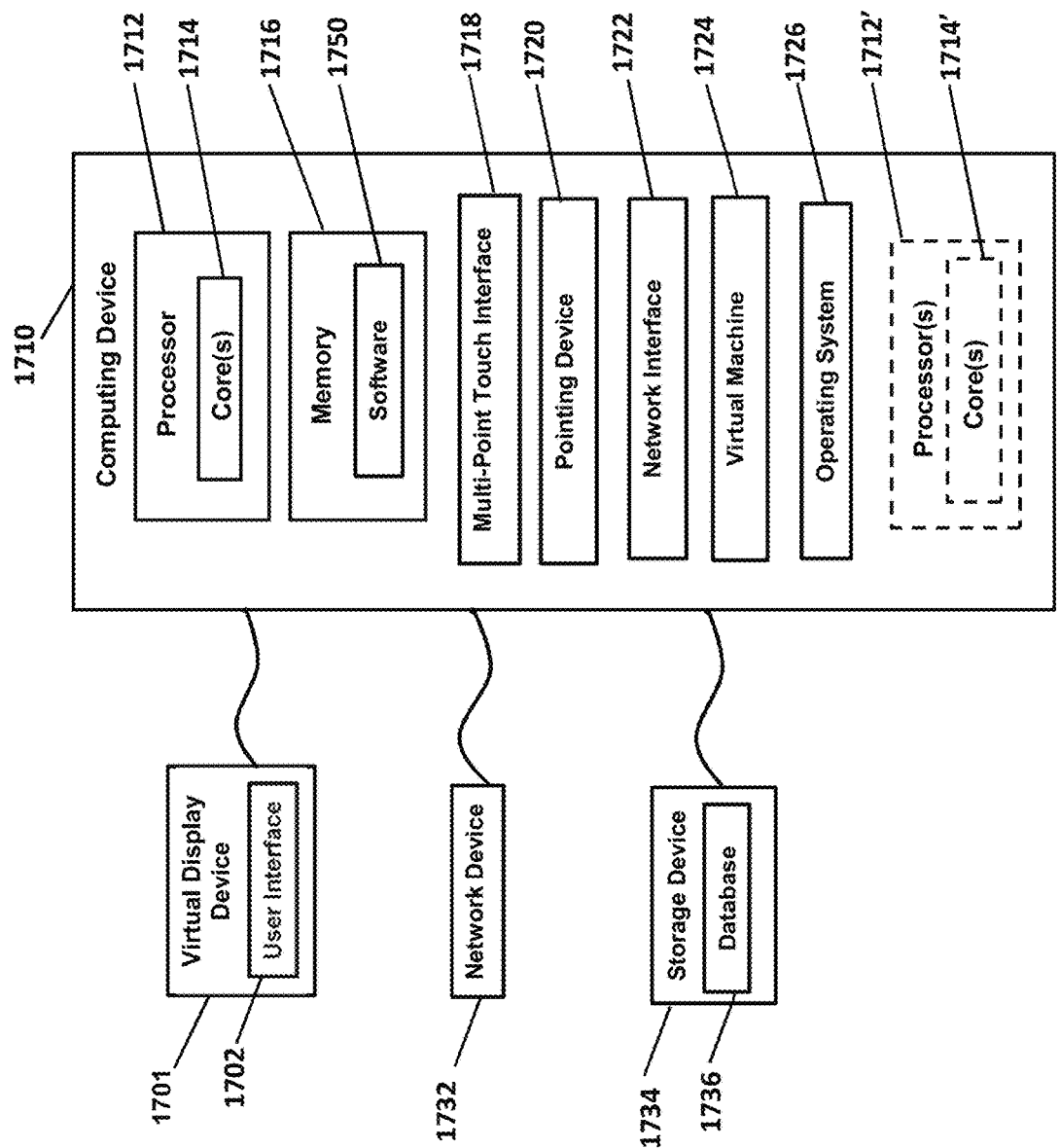
FIG. 17 is a block diagram of an exemplary computing system.

FIG. 17 is a block diagram of an exemplary computing device 1710 such as can be used, or portions thereof, in accordance with various embodiments as described above with reference to FIGS. 1-14. The computing device 1710 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more flash drives), and the like. For example, memory 1716 included in the computing device 1710 can store computer-readable and computer-executable instructions or software for performing the operations disclosed herein. For example, the memory can store software application 1740 which is programmed to perform various of the disclosed operations as discussed with respect to FIGS. 1-14. The computing device 1710 can also include configurable and/or programmable processor 1712 and associated core 1714, and optionally, one or more additional configurable and/or programmable processing devices, e.g., processor(s) 1712' and associated core (s) 1714' (for example, in the case of computational devices having multiple processors/cores), for executing computer-readable and computer-executable instructions or software stored in the memory 1716 and other programs for controlling system hardware. Processor 1712 and processor(s) 1712' can each be a single core processor or multiple core (1714 and 1714') processor.

Virtualization can be employed in the computing device 1710 so that infrastructure and resources in the computing device can be shared dynamically. A virtual machine 1724 can be provided to handle a process running on multiple processors so that the process appears to be using only one computing resource rather than multiple computing resources. Multiple virtual machines can also be used with one processor.

Memory 1716 can include a computational device memory or random access memory, such as but not limited to DRAM, SRAM, EDO RAM, and the like. Memory 1716 can include other types of memory as well, or combinations thereof.

A user can interact with the computing device 1710 through a visual display device 1701, 111A-D, such as a computer monitor, which can display one or more user interfaces 1702 that can be provided in accordance with exemplary embodiments. The computing device 1710 can include other I/O devices for receiving input from a user, for example, a keyboard or any suitable multi-point touch interface 1718, a pointing device 1720 (e.g., a mouse). The keyboard 1718 and the pointing device 1720 can be coupled to the visual display device 1701. The computing device 1710 can include other suitable conventional I/O peripherals.

The computing device 1710 can also include one or more storage devices 1734, such as but not limited to a hard-drive, CD-ROM, or other computer readable media, for storing data and computer-readable instructions and/or software that perform operations disclosed herein. Exemplary storage device 1734 can also store one or more databases for storing any suitable information required to implement exemplary embodiments. The databases can be updated manually or automatically at any suitable time to add, delete, and/or update one or more items in the databases.

The computing device 1710 can include a network interface 1722 configured to interface via one or more network devices 1732 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1722 can include a built-in network adapter, network interface card, PCMCIA network card, card bus network adapter, wireless network adapter, USB network adapter, modem or any other device suitable for interfacing the computing device 1710 to any type of network capable of communication and performing the operations described herein. Moreover, the computing device 1710 can be any computational device, such as a workstation, desktop computer, server, laptop, handheld computer, tablet computer, or other form of computing or telecommunications device that is capable of communication and that has sufficient processor power and memory capacity to perform the operations described herein.

The computing device 1710 can run any operating system 1726, such as any of the versions of the Microsoft® Windows® operating systems (Microsoft, Redmond, Wash.), the different releases of the Unix and Linux operating systems, any version of the MAC OS® (Apple, Inc., Cupertino, Calif.) operating system for Macintosh computers, any embedded operating system, any real-time operating system, any open source operating system, any proprietary operating system, or any other operating system capable of running on the computing device and performing the operations described herein. In exemplary embodiments, the operating system 1726 can be run in native mode or emulated mode. In an exemplary embodiment, the operating system 1726 can be run on one or more cloud machine instances.

Figure 18:
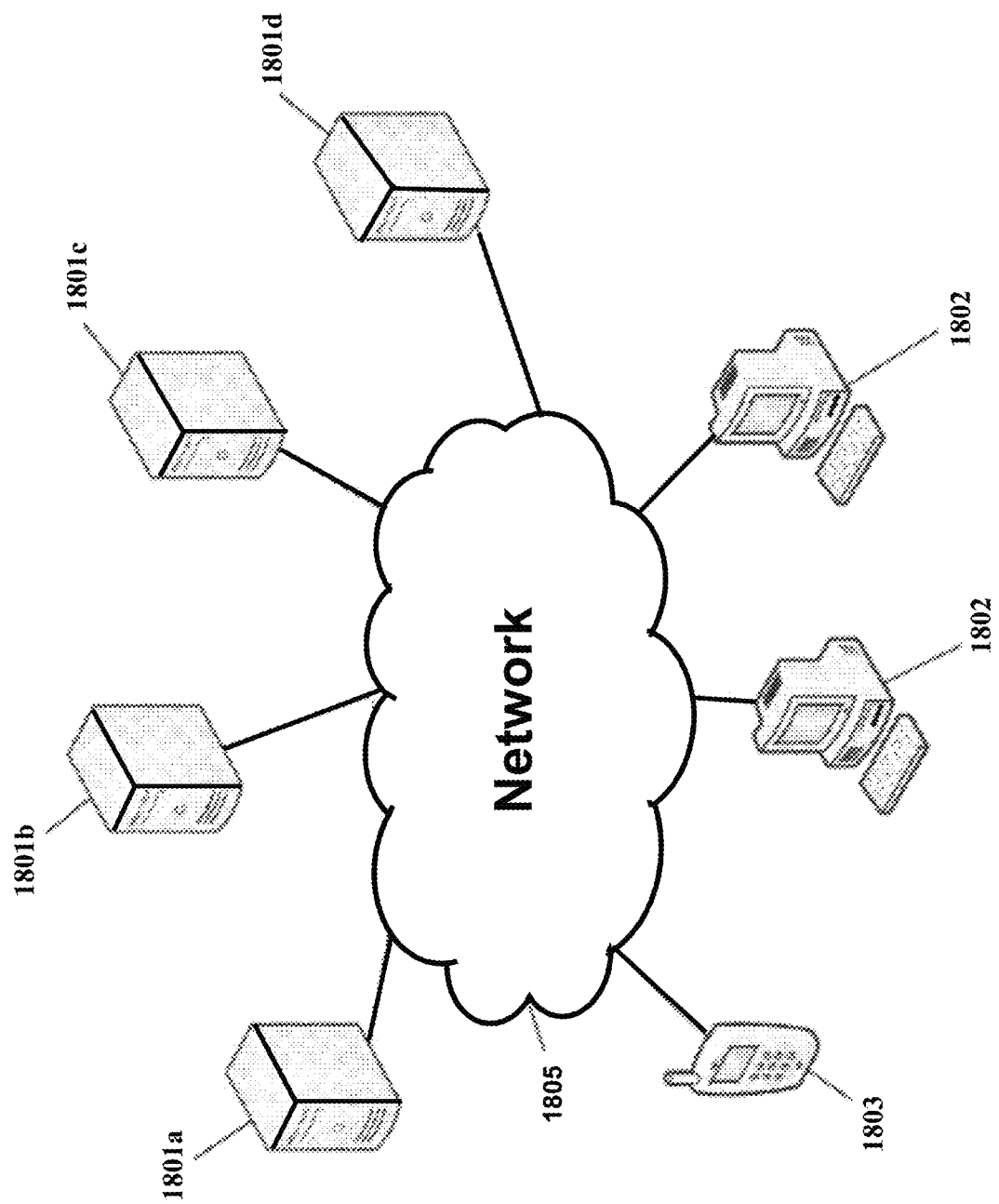
FIG. 18 is a network diagram of an exemplary distributed network.

FIG. 18 is an example computational device block diagram of certain distributed embodiments. Although FIGS. 1-14, and portions of the exemplary discussion above, make reference to a warehouse management system 15, order-server 14, or other server 902 each operating on an individual or common computing device, one will recognize that any one of the warehouse management system 15, the order-server 14, or the other server 902 may instead be distributed across a network 1805 in separate server systems 1801*a-d* and possibly in user systems, such as kiosk, desktop computer device 1802, or mobile computer device 1803. For example, the order-server 14 may be distributed amongst the tablets 48 of the robots 18. In some distributed systems, modules of any one or more of the warehouse management system software and/or the order-server software can be separately located on server systems 1801*a-d* and can be in communication with one another across the network 1805.

While the foregoing description of the invention enables one of ordinary skill to make and use what is considered presently to be the best mode thereof, those of ordinary skill will understand and appreciate the existence of variations, combinations, and equivalents of the specific embodiments and examples herein. The above-described embodiments of the present invention are intended to be examples only. Alterations, modifications and variations may be effected to the particular embodiments by those of skill in the art without departing from the scope of the invention, which is defined solely by the claims appended hereto. The invention is therefore not limited by the above described embodiments and examples.

Having described the invention, and a preferred embodiment thereof, what is claimed as new and secured by Letters Patent is:

1. A method for presorting and executing robot-assisted putaway tasks in a navigational space, the method comprising:
   assigning each of a plurality of item storage arrays to one of a plurality of zones defined within the navigational space, each item storage array including a plurality of interconnected containers, each of the interconnected containers for storing items associated with a putaway task;
   scanning, by a scanning device, an item identifier of at least one of a plurality of unsorted items to be stored at locations throughout the warehouse;
   retrieving, by a centralized server, in response to receiving identifying information corresponding to the at least one scanned unsorted item, item data describing a storage location for putaway within the warehouse of each of the at least one scanned item;
   determining, from the storage location, a corresponding one of the plurality of zones of the warehouse in which the storage location is located; and
   placing each scanned unsorted item into an interconnected container of one of the item storage arrays assigned to the corresponding one of the zones.

2. The method of claim 1, further comprising:
   inducting the item storage array into which the scanned unsorted item was placed to a robot;
   transmitting, from the centralized server to at least one robot, a putaway task assignment associated with each of the plurality of interconnected containers of the inducted item storage array; and
   navigating the robot, via a processor of the robot and in response to receipt of the putaway task assignments at the robot, to locations throughout the warehouse to execute the putaway task assignments.

3. The method of claim 2 wherein the item storage array is attached to an armature affixed to the robot and the item storage array is located above a surface of the robot.

4. The method of claim 2, wherein the step of navigating includes displaying, by the robot, at least one of a container identification number and a container color to inform an operator which of the interconnected containers in the inducted item storage array is associated with the execution of each putaway task assignment.

5. The method of claim 1, further comprising:
   displaying an identification of the corresponding one of the zones on at least one of the scanning device or a computing device.

6. The method of claim 1, wherein:
   each item storage array includes an array identifier associated with the item storage array per se rather than the individual containers; and
   each item storage array includes a container identifier associated with each of the individual containers in the item storage array.

7. The method of claim 6, wherein the step of assigning further comprises:
   scanning, by the scanning device, the array identifier of the item storage array; and
   assigning, responsive to a user input at a user interface of the at least one of the scanning device or a computing device, the item storage array to one of the plurality of zones.

8. The method of claim 6, wherein the step of assigning further comprises:
   correlating, in the centralized server, the array identifier of the item storage array into which a first one of the at least one scanned unsorted items is placed with the corresponding one of the zones.

9. The method of claim 8, further comprising:
   scanning, by the scanning device, an item identifier of an additional unsorted item to be stored;
   retrieving, by the centralized server, in response to receiving identifying information corresponding to the additional scanned unsorted item, additional item data describing an additional storage location for putaway within the warehouse of the additional scanned item;
   determining, from the additional storage location of the additional scanned item, that the additional scanned item corresponds to a same corresponding zone;
   placing the additional scanned unsorted item into an empty one of the interconnected containers of the item storage array assigned to the same corresponding zone.

10. The method of claim 9, further comprising:
displaying an identification of the empty one of the interconnected containers of the item storage array on at least one of the scanning device or a computing device.

11. A presorting system for executing robot-assisted putaway tasks within a navigational space:
a plurality of item storage arrays each including a plurality of interconnected containers, each of the interconnected containers for storing items associated with a putaway task;
at least one scanning device configured to scan an item identifier of at least one of a plurality of unsorted items, the item identifier correlated to item data stored in a centralized server, the item data describing a storage location for putaway within the warehouse;
the centralized server including a memory storing instructions that, when executed by the processor, cause the system to:
assign each of the plurality of item storage arrays to one of a plurality of zones defined within the navigational space;
scan an item identifier of at least one of the plurality of unsorted items to be stored at locations throughout the warehouse;
retrieve, in response to receiving identifying information corresponding to the at least one scanned unsorted item, the item data;
determine, from the storage location, a corresponding one of the plurality of zones of the warehouse in which the storage location is located;
associate each scanned unsorted item with an interconnected container of one of the item storage arrays assigned to the corresponding one of the zones.

12. The system of claim 11, further comprising at least one robot, the robot including:
a mobile base for inducting the item storage array into which the scanned unsorted item was placed;
a transceiver for receiving, at the robot, a putaway task assignment from the centralized server associated with each of the plurality of containers of the item storage array, and
a processor configured to, in response to receipt of the putaway task assignments by the transceiver, navigate the robot to locations throughout the warehouse to execute the putaway task assignments associated with each of the plurality of containers of the item storage array.

13. The system of claim 12 wherein the item storage array is attached to an armature affixed to the robot and the item storage array is located above a surface of the robot.

14. The system of claim 12, wherein the item storage array is disposed on a surface of the at least one robot.

15. The system of claim 11, further comprising a display of at least one of the scanning device or a computing device configured to display an identification of at least one of the corresponding one of the zones or the associated interconnected container.

16. The system of claim 11, wherein each item storage array includes:
an array identifier associated with the item storage array per se rather than the individual containers; and
a container identifier associated with each of the individual containers in the item storage array.

17. The system of claim 16, wherein the memory also stores instructions that, when executed by the processor cause the system to:
scan the array identifier of the item storage array; and
assign, responsive to a user input at a user interface of the at least one of the scanning device or a computing device, the item storage array to one of the plurality of zones.

18. The system of claim 16, wherein the memory also stores instructions that, when executed by the processor cause the system to:
correlate, in the centralized server, the array identifier of the item storage array into which a first one of the at least one scanned unsorted items is placed with the corresponding one of the zones.

19. The system of claim 18, wherein the memory also stores instructions that, when executed by the processor cause the system to:
scan an item identifier of an additional unsorted item to be stored;
retrieve, in response to receiving identifying information corresponding to the additional scanned unsorted item, additional item data describing an additional storage location for putaway within the warehouse of the additional scanned item;
determine, from the additional storage location of the additional scanned item, that the additional scanned item corresponds to a same corresponding zone;
associate the additional scanned unsorted item with an empty one of the interconnected containers of the item storage array assigned to the same corresponding zone.

20. The system of claim 19, wherein the memory also stores instructions that, when executed by the processor cause the system to:
display an identification of the associated empty one of the interconnected containers of the item storage array on at least one of the scanning device or a computing device.

* * * * *